(12) United States Patent
Qi

(10) Patent No.: US 12,092,229 B2
(45) Date of Patent: Sep. 17, 2024

(54) VALVE BANK AND SMART CONTROL VALVE

(71) Applicant: Parker-Hannifin Corporation, Cleveland, OH (US)

(72) Inventor: Yufeng Qi, Ada, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 17/936,448

(22) Filed: Sep. 29, 2022

(65) Prior Publication Data

US 2023/0116100 A1 Apr. 13, 2023

Related U.S. Application Data

(60) Provisional application No. 63/254,639, filed on Oct. 12, 2021.

(51) Int. Cl.
| | |
|---|---|
| *F16K 11/22* | (2006.01) |
| *F16K 11/24* | (2006.01) |
| *F16K 27/00* | (2006.01) |
| *F16K 27/04* | (2006.01) |

(52) U.S. Cl.
CPC ............ *F16K 11/22* (2013.01); *F16K 11/24* (2013.01); *F16K 27/003* (2013.01); *F16K 27/041* (2013.01); *F16K 27/048* (2013.01)

(58) Field of Classification Search
CPC . F16L 1/22; F16L 11/24; F16L 27/003; F16L 27/041; F16L 27/048
See application file for complete search history.

(56) References Cited

U.S. PATENT DOCUMENTS

| | | | | |
|---|---|---|---|---|
| 5,617,898 A | * | 4/1997 | Nagai | F15B 13/0864 137/884 |
| 6,520,202 B2 | * | 2/2003 | Miyazoe | F15B 13/0817 137/554 |
| 9,410,639 B2 | * | 8/2016 | Fukano | F16K 31/124 |
| 2015/0176718 A1 | | 6/2015 | Zhuo | |
| 2019/0120264 A1 | | 4/2019 | Doll et al. | |

(Continued)

FOREIGN PATENT DOCUMENTS

| | | | |
|---|---|---|---|
| WO | WO-2018164669 A1 * | 9/2018 | ........ F15B 13/0817 |
| WO | 2019072930 A1 | 4/2019 | |

*Primary Examiner* — Michael R Reid
(74) *Attorney, Agent, or Firm* — Renner, Otto, Boisselle & Sklar, LLP

(57) ABSTRACT

An exemplary valve bank and/or modular control valve having a valve body, a valve member movable in a fluid flow of the valve body to control flow of fluid, and an onboard electronic controller that is operably mounted to the valve bank or valve body. The onboard controller is operably connected to at least one actuator of the valve, which is configured to control movement of the valve member in response to commands from the onboard controller. The onboard controller may provide diagnostics, feedback and/or control of the control valve, such as via inputs from one or more sensors that may be included in the valve. The modular control valve may be used with conventional non-intelligent valve banks to thereby impart smart diagnostics and/or feedback into the valve bank in a plug-and-play manner. A communications interface may be provided in the control valve to interface and communicate with an upper-level PLC controller.

16 Claims, 19 Drawing Sheets

(56) References Cited

U.S. PATENT DOCUMENTS

| | | |
|---|---|---|
| 2019/0136880 A1 | 5/2019 | Neumann et al. |
| 2019/0145437 A1 | 5/2019 | Fujiwara |
| 2020/0310470 A1 | 10/2020 | Viste |
| 2021/0131459 A1 | 5/2021 | Weickel et al. |

* cited by examiner

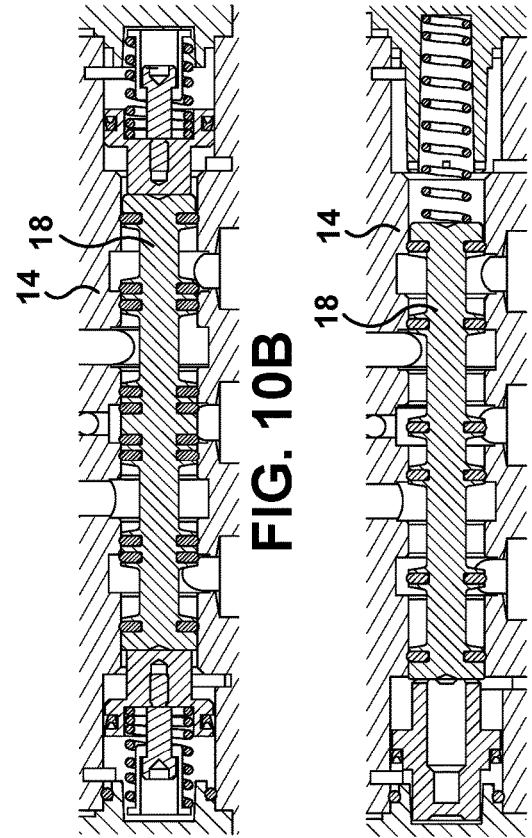
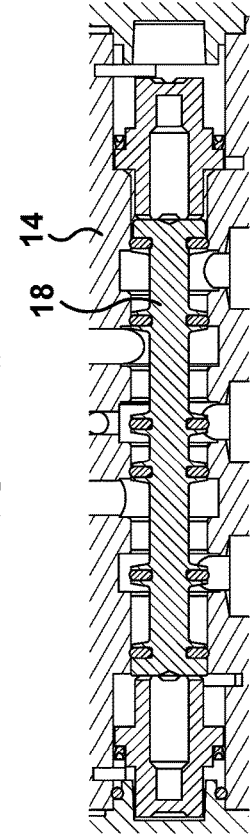
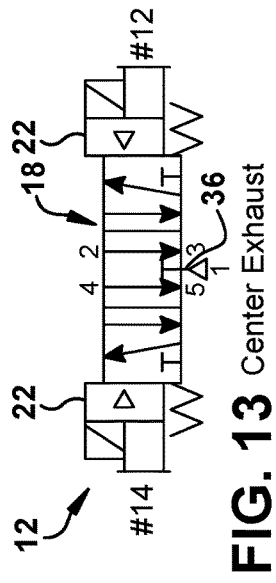
FIG. 10B
FIG. 11B
FIG. 12B
FIG. 10A All Ports Blocked
FIG. 11A
FIG. 12A
FIG. 13 Center Exhaust
FIG. 14 Pressure Center

VALVE BANK AND SMART CONTROL VALVE

RELATED APPLICATIONS

This application claims the benefit of U.S. Provisional Application No. 63/254,639 filed Oct. 12, 2021, which is incorporated herein by reference in its entirety.

TECHNICAL FIELD

The present disclosure relates generally to valve banks, such as for pneumatic or hydraulic control, and more particularly to modular control valves for such valve banks.

BACKGROUND

Control valves are commonly used to control one or more actuators or other movable members in a hydraulic or pneumatic system, such as for use in operating machinery in a factory, for example. Each movable member in the system is typically controlled by the movement of a valve member, such as a spool, that moves within a valve body to permit, restrict and/or control the flow of the working fluid through different fluid passages in the valve body, thereby controlling the movement of the actuator or other movable member. A valve bank is an assembly of such control device(s), which may include a single control valve to operate a single movable member, or which may include a plurality of control valves to operate a plurality of movable members.

Typically, the valve bank includes a plurality of control valve sections, in which each control valve section is connected to a base that constitutes a fluid manifold through which operating fluid is communicated to operate the control device(s). This allows the operating fluid to be supplied from a source into the fluid manifold, such that the fluid can then be supplied to the individual control valves.

The control valves of conventional valve banks typically are controlled by an upper-level programmable control logic (PLC) controller that commands the control of the control valve via a suitable actuator, such as a solenoid. In systems where diagnostics or feedback is desired, some conventional valve banks utilize an external intermediate controller connected to the valve bank to receive communications from suitable sensor(s) which may then be relayed to the upper-level PLC controller.

SUMMARY

The conventional valve banks and/or control valves of the type described above are limited in the modular tailorability and/or capabilities they provide by requiring communication to an external electronic controller for control of the modular control valve.

An aspect of the present disclosure provides a unique valve bank or modular control valve such as for use with valve banks, in which an onboard electronic controller is provided that enables intelligent diagnostics, feedback and/or control of the control valve.

Such a smart control valve may provide one or more advantages that may significantly enhance the tailorability and/or capability of the valve bank by use of such a modular control valve.

For example, such a modular control valve may minimize the complexity of the valve bank by reducing or eliminating the need for an intermediate external controller mounted to the valve bank for communication to an upper level PLC control.

Such a modular control valve may be used with conventional non-intelligent valve banks to thereby impart smart diagnostics and/or feedback into the valve bank in a plug-and-play manner simply via modular installation of the control valve. Alternatively, or additionally, the modular control valve may enable standalone diagnostics, feedback and/or control of the valve.

According to one aspect of the present disclosure, a directional control valve such as for connection to a fluid manifold, includes: a valve body having a fluid flow path; a directional control valve member movable in the fluid flow path and relative to the valve body to control flow of fluid through the valve body; an onboard electronic controller operably mounted to the valve body; and at least one actuator operably connected to the onboard electronic controller, the at least one actuator being configured to control movement of the valve member in response to commands from the onboard electronic controller.

The control valve may further include at least one sensor operably mounted to the valve body, the sensor being configured to sense a characteristic associated with a function of at least one of the modular control valves and the valve bank, which may include upstream or downstream functions such as operation of a fluid-operated device or machine controlled by the valve bank.

The onboard electronic controller is operably coupled to the sensor and is configured to receive information from the sensor that corresponds with the characteristic, the onboard electronic controller being configured to control movement of the valve member via the actuator based upon the information received from the sensor.

The control valve also may be operably coupled to an external programmable logic controller (PLC), such as via a transceiver. The onboard electronic controller may be configured to control movement of the valve member via the actuator based upon the commands received from the PLC.

According to another aspect of the present disclosure, a valve bank for controlling flow of a fluid includes: a fluid manifold; a plurality of modular control valves fluidly connected to the fluid manifold; and a sensor configured to sense a characteristic associated with a function of the valve bank; wherein: at least one modular control valve of the plurality of modular control valves includes: (i) a valve body adapted for fluid connection to the fluid manifold, the valve body having an inlet passage, an outlet passage, and a fluid flow path extending between the inlet and outlet passages; (ii) a valve member movable in the fluid flow path and relative to the valve body to control flow of the fluid through the valve body; an onboard electronic is controller operably mounted to the valve body; and at least one actuator is operably connected to the onboard electronic controller, the at least one actuator being configured to control movement of the valve member of the at least one modular control valve in response to commands from the onboard electronic controller; wherein the onboard electronic controller is operably coupled to the sensor and is configured to receive information from the sensor that corresponds with the characteristic, the onboard electronic controller being configured to control movement of the valve member via the at least one actuator based upon the information received from the sensor.

According to an aspect of the present disclosure, a method of operating a modular control valve includes: (i) mounting the modular control valve to a fluid manifold of a valve bank, wherein the modular control valve includes an onboard electronic controller that is configured to provide diagnostics, feedback and/or control of at least one of the control valves, the valve bank, or an associated device; and (ii) performing an operation by using the onboard electronic controller.

In exemplary embodiments, the onboard electronic controller may be configured to perform one or more of the following operations: (i) leakage check function using pressure decay; (ii) actuator response time; (iii) fluid-operated device response time; (iv) load condition sensing; (v) jammed fluid-operated device detection; (vi) dynamic leak check; (vii) cushion check; (viii) load hold monitoring; (ix) short and open circuit detection; (x) high and low temperature detection; (xi) monitoring adjacent control valves; (xii) monitoring stroke time.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 10A is a schematic circuit diagram of the modular control valve in FIG. 8.

FIG. 10B is a sectional view of the valve show of FIG. 10A showing an exemplary valve member in the valve body, which is taken from a different cross-section than that shown in FIG. 8.

FIG. 11A is a schematic circuit diagram of another exemplary modular control valve. FIG. 11B is a sectional view of FIG. 11A.

FIG. 12A is a schematic circuit diagram of another exemplary modular control valve. FIG. 12B is a sectional view of FIG. 12A.

FIG. 13 is a schematic circuit diagram of another exemplary modular control valve.

FIG. 14 is a schematic circuit diagram of another exemplary modular control valve.

DETAILED DESCRIPTION

The principles and aspects of the present disclosure have particular application to pneumatic valve banks, and more particularly to modular control valves for such valve banks, which may be used for automation control in a factory, and thus will be described below chiefly in this context. It is understood, however, that the principles and aspects of the present disclosure may be applicable to other valve banks and/or other control valves for other applications where it is desirable to provide one or more advantages, such as enhancing the tailorability and/or capability of the valve bank; minimizing the complexity of the valve bank; enhancing the diagnostic and/or feedback capability of a conventional valve bank; and/or providing standalone control of the control valve. Such applications may be used with hydraulic or other valve banks for use in assembly plants, on machines, vehicles, or the like.

Figure 1:
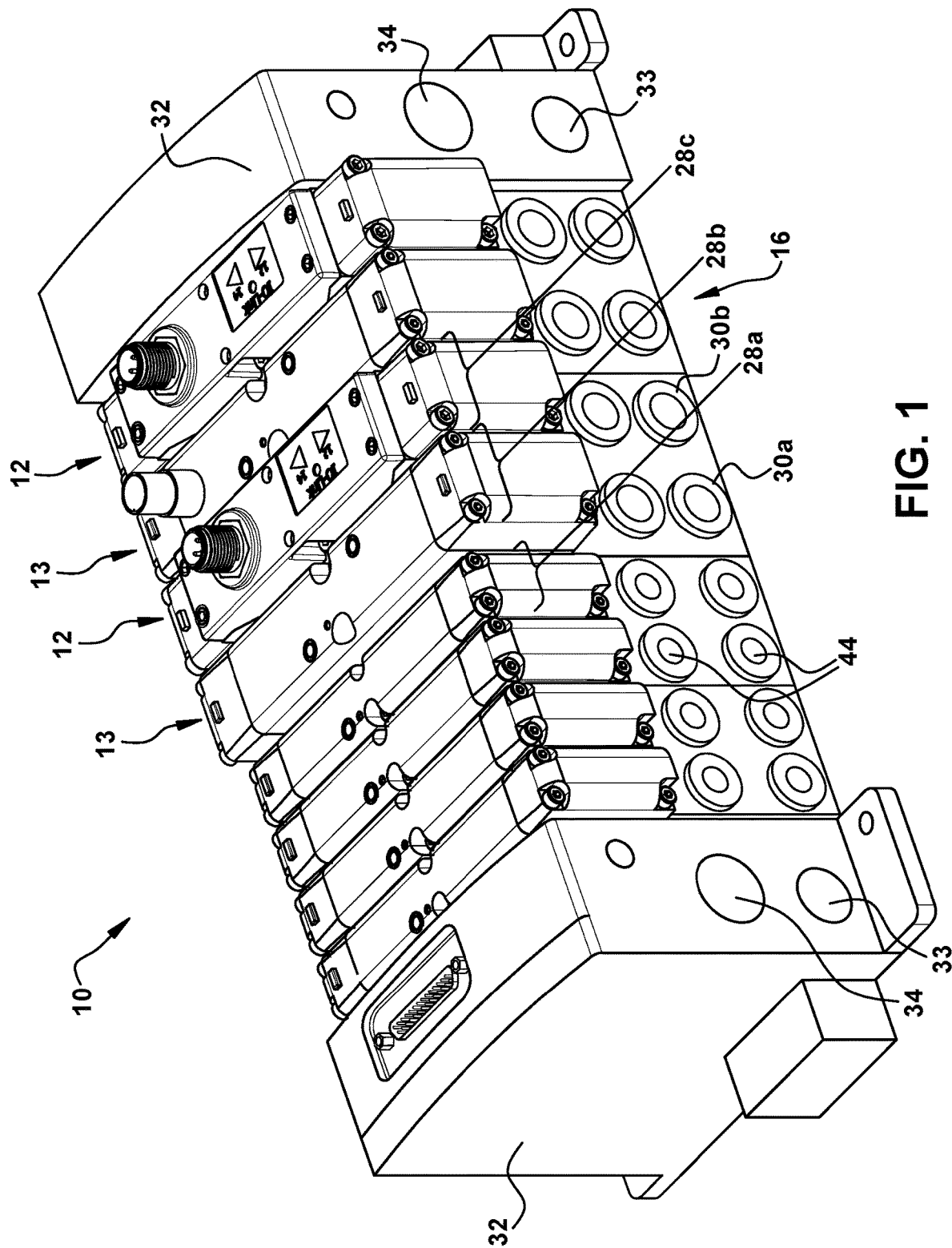
FIG. 1 is a top, front, left perspective view of an exemplary valve bank, including an exemplary modular control valve according to an embodiment of the present disclosure.
Figure 2:
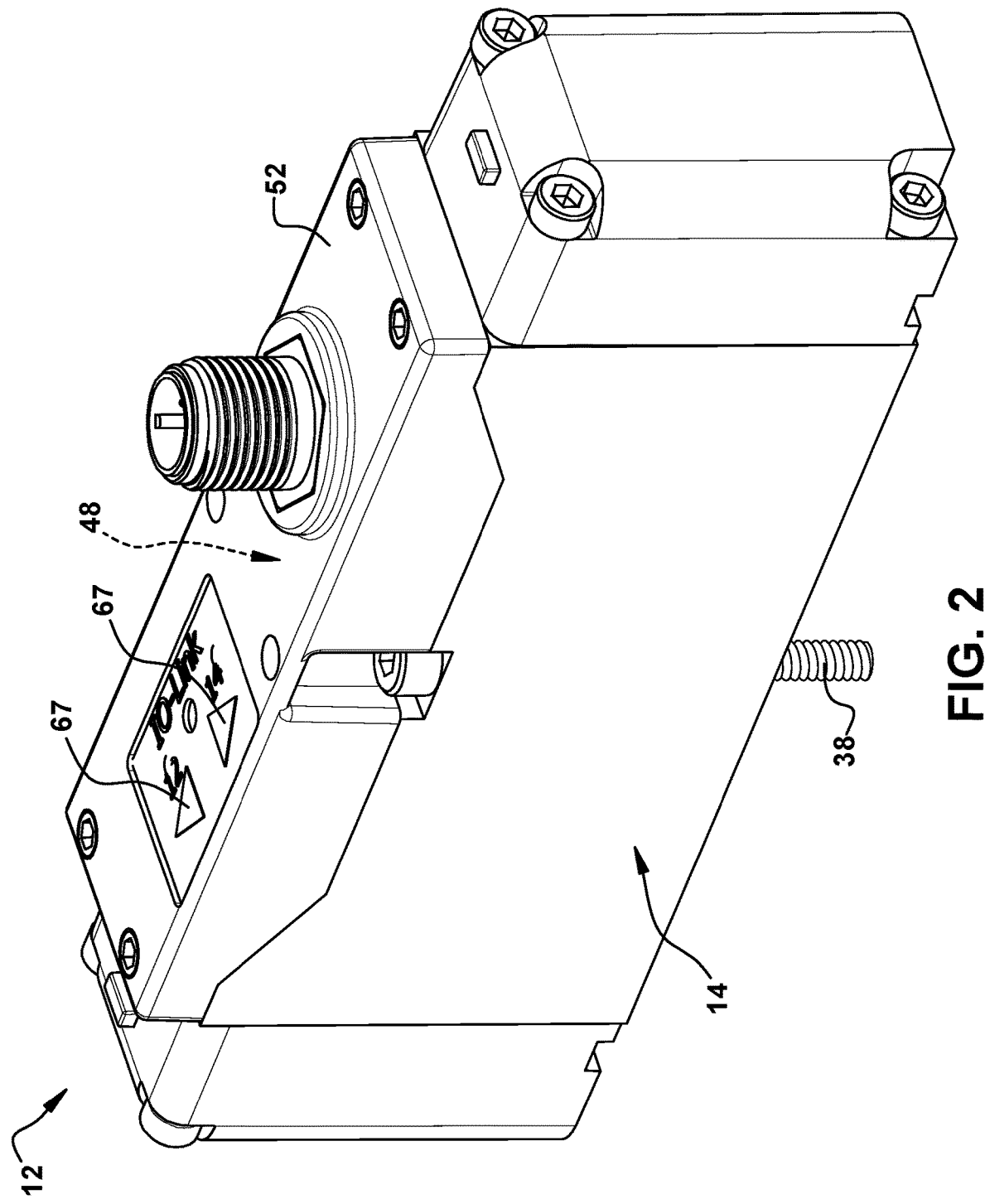
FIG. 2 is a top, rear, right perspective view of the exemplary modular control valve shown in FIG. 1, in which a cover portion of the control valve is shown in transparent view.
Figure 6:
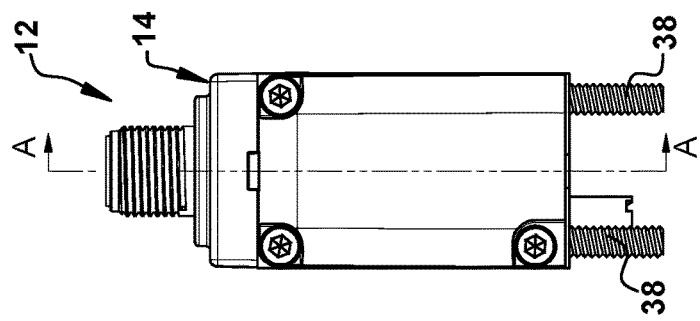
FIG. 6 is a rear view of the modular control valve.
Figure 3:
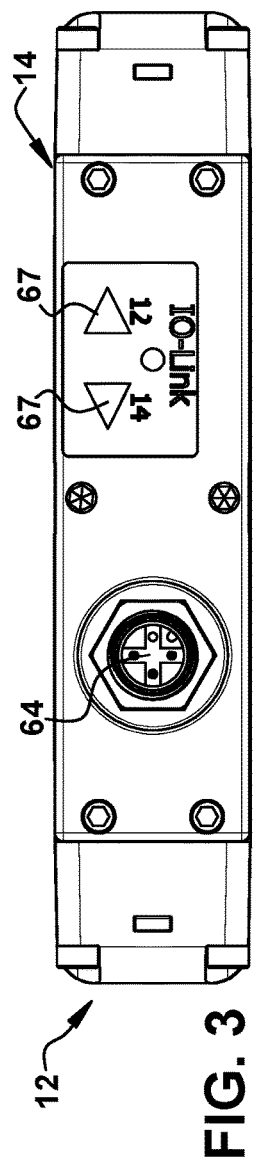
FIG. 3 is a top view of the modular control valve, in which the cover portion is shown in opaque view.
Figure 4:
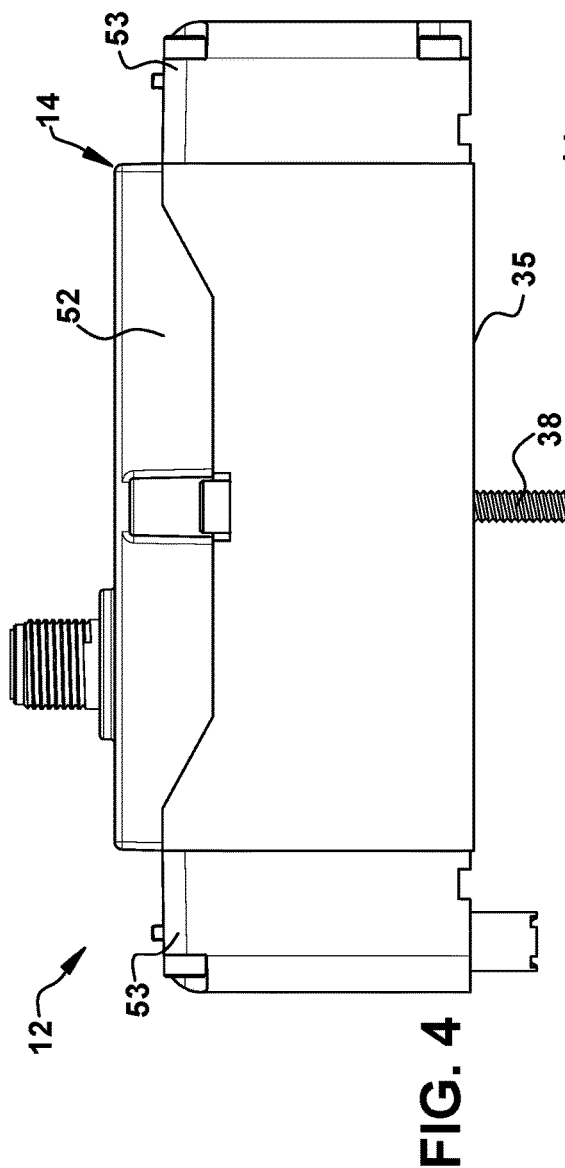
FIG. 4 is a left side view of the modular control valve.
Figure 5:
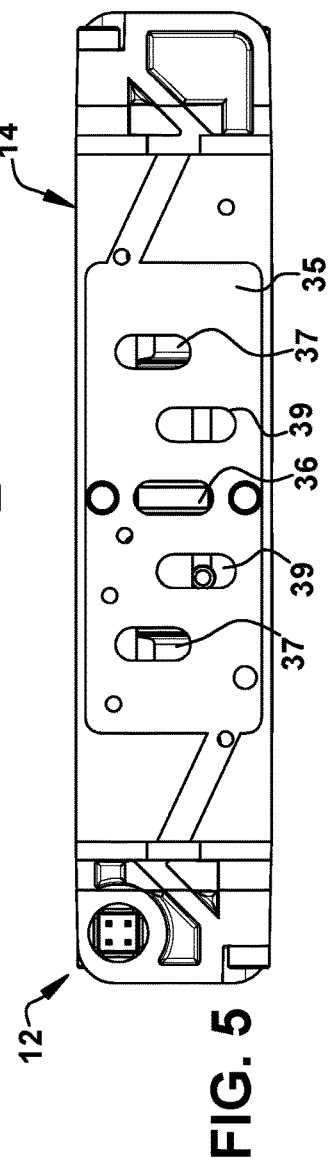
FIG. 5 is a bottom view of the modular control valve.
Figure 7:
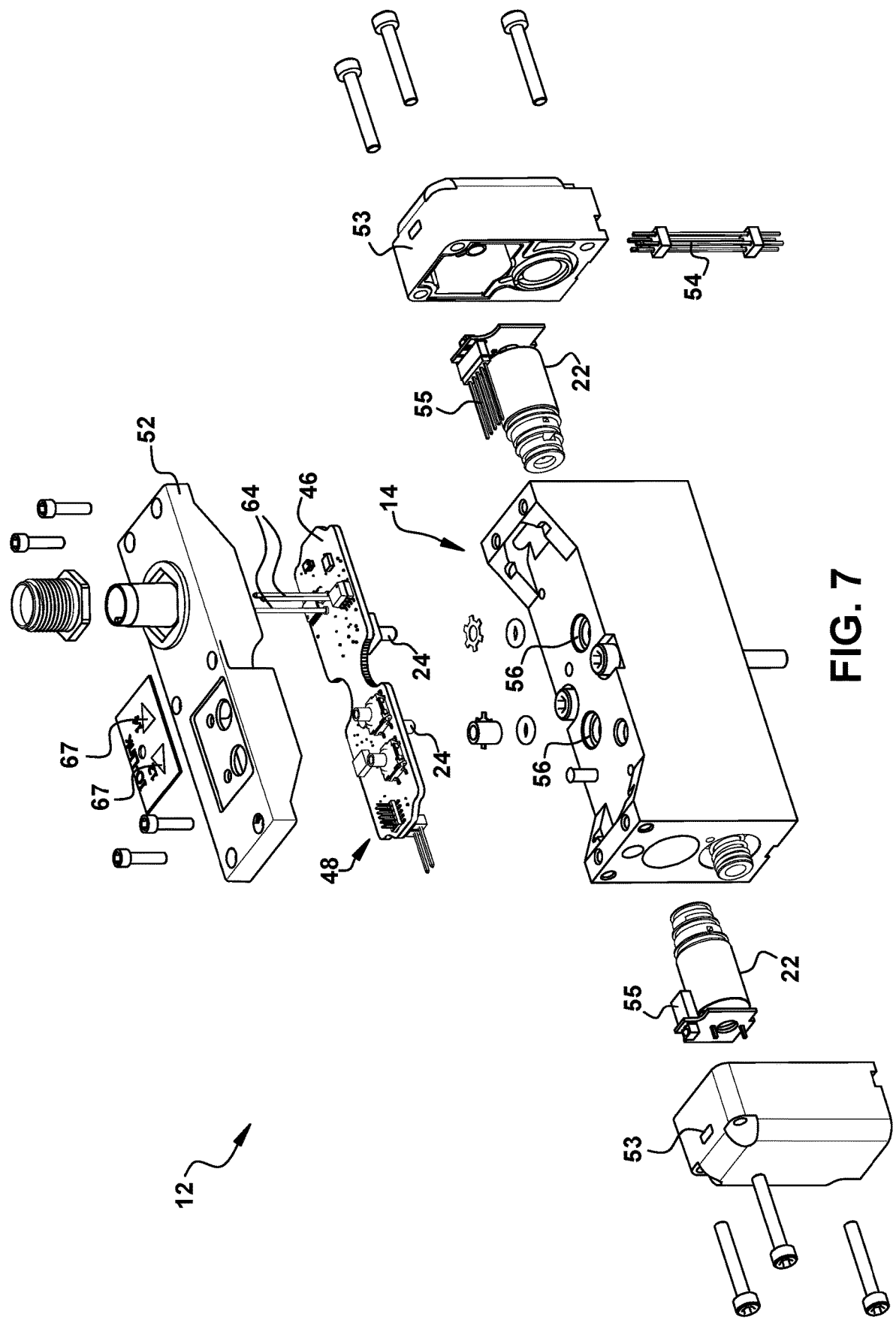
FIG. 7 is a perspective exploded view of the modular control valve.

Referring to FIG. 1, an exemplary valve bank 10 including one or more exemplary control valves 12 is shown. In the illustrated embodiment, the valve bank 10 includes two such control valves 12, an example of one of which is shown in further detail in FIGS. 2-8. As described in further detail below, the exemplary control valve 12 includes a modular valve body 14 having fluid flow passage(s) that define a fluid flow path for fluid communication with a source of fluid, such as from a fluid manifold 16 of the valve bank 10. The control valve 12 includes a valve member 18 that is movable in the fluid flow path and relative to the valve body 14 to control flow of fluid through the valve body 14. The control bank 10 also includes an onboard electronic controller 20, which may be operatively mounted to the valve bank 10, such as operably mounted to the valve body 14. The onboard electronic controller 20 is operably connected to at least one actuator 22 of the valve 12, which is configured to control movement of the valve member 18 in response to commands from the onboard electronic controller 20. The onboard electronic controller 20 provides for diagnostics, feedback and/or control of the control valve, such as via inputs from one or more sensors 24 which also may be included in the valve 12, as will be described in further detail below.

In the illustrated embodiment, the valve bank 10 is a pneumatic valve bank that utilizes compressed air as a working fluid for controlling one or more actuators (e.g., piston-cylinders 26, FIG. 9) or other fluid-operated devices on a machine (not shown), such as an automation machine in an assembly plant, for example. As shown, the valve bank 10 includes a plurality of valve sections 28a, 28b, 28c, etc. Generally, each valve section 28a-c may be configured as a discrete modular unit of the valve bank 10, in which each valve section 28a-c may have a corresponding control valve 12 or other functional component of the valve bank 10. In the illustrated embodiment, the exemplary control valves 12 are include amid a plurality of other conventional control valves 13.

In the illustrated embodiment, each control valve 12, 13 or other functional component is mounted to a corresponding modular fluid manifold 30a, 30b that constitutes a base of the valve section 28c, 28b. Each modular fluid manifold (e.g., 30a, etc.) is configured to interface with, and operatively couple to, an adjacent modular manifold (e.g., 30b, etc.). These modular fluid manifolds 30a, 30b, etc. are fluidly and sealingly coupled together to form the fluid manifold 16 that serves as an air manifold in the illustrated embodiment, and which provides a continuous fluid flow path across the various modular manifolds 30a, 30b, etc. for enabling supply of air to each corresponding control valve 12, 13, etc. In alternative embodiments, the fluid manifold 16 may be formed from one or more continuous single piece structures on which multiple such control valves 12, 13 or other functional components may be mounted.

In exemplary embodiments, at least one of the valve sections may include a supply module having an inlet port for supplying fluid, such as air, from a source, such as an air compressor, to the manifold 16. The valve bank 10 also includes end plates 32 on opposite ends of the valve bank 10. The end plates 32 are configured to contain the working fluid in the manifold 16. In the illustrated embodiment, the end plates 32 include inlet ports 34 for supplying fluid to the manifold 16, and thus serve as the supply modules. The end plates 32 also include exhaust ports 33 for exhausting fluid from the manifold 16. It is understood that although the exemplary valve bank 10 has a plurality of valve sections 28a, 28b, etc., other such valve banks may have greater or fewer valve sections, such as one or more valve sections. It is also understood that although the exemplary valve bank 10 is a pneumatic valve bank, other types of valve banks may be utilized, such as hydraulic valve banks or the like, as would be understood by those having ordinary skill in the art.

Referring to FIGS. 2-9, the exemplary modular control valve 12 will be described in further detail. As discussed above, each modular control valve 12 is configured to interface with, and operatively couple to, a corresponding portion of the fluid manifold 16; or as shown in the illustrated embodiment, a corresponding modular manifold section (e.g., 30a, 30b, etc.). As such, although features will be described below chiefly in the context of the exemplary modular control valve 12, it is understood that certain structures and features of the control valve 12 are common to the other types of control valves in valve bank 10 (such as those shown in FIGS. 10A-17, for example).

As shown in the illustrated embodiment, the modular valve body 14 of the control valve 12 includes a mounting face 35 on a bottom side of the valve that is configured to interface with the fluid manifold 16 with a sealing engagement (such as with seal members). The mounting face 35 may include at least one inlet port 36 and/or at least one outlet port 37 for transferring fluid into and out of the valve body. the mounting face 35 also may include one or more work ports 39, such as for supplying or receiving fluid flow from the fluid operated device 26 (see e.g., FIG. 9). The fluid manifold section 16 also includes corresponding ports (hidden from view) that fluidly connect with the ports 36, 37, 39 of the valve body 14 for ingress or egress of fluid flow into or out of the valve body 14. In exemplary embodiments, the mounting face 35 of the valve body 14 may be configured to correspond with the mounting face of a conventional control valve (e.g. 13) so that the exemplary control valve 12 may be retrofitted onto an existing conventional fluid manifold of a conventional valve bank. As shown, one or more fasteners 38 may be utilized to secure the control valve 12 to the fluid manifold 16.

Figure 8:
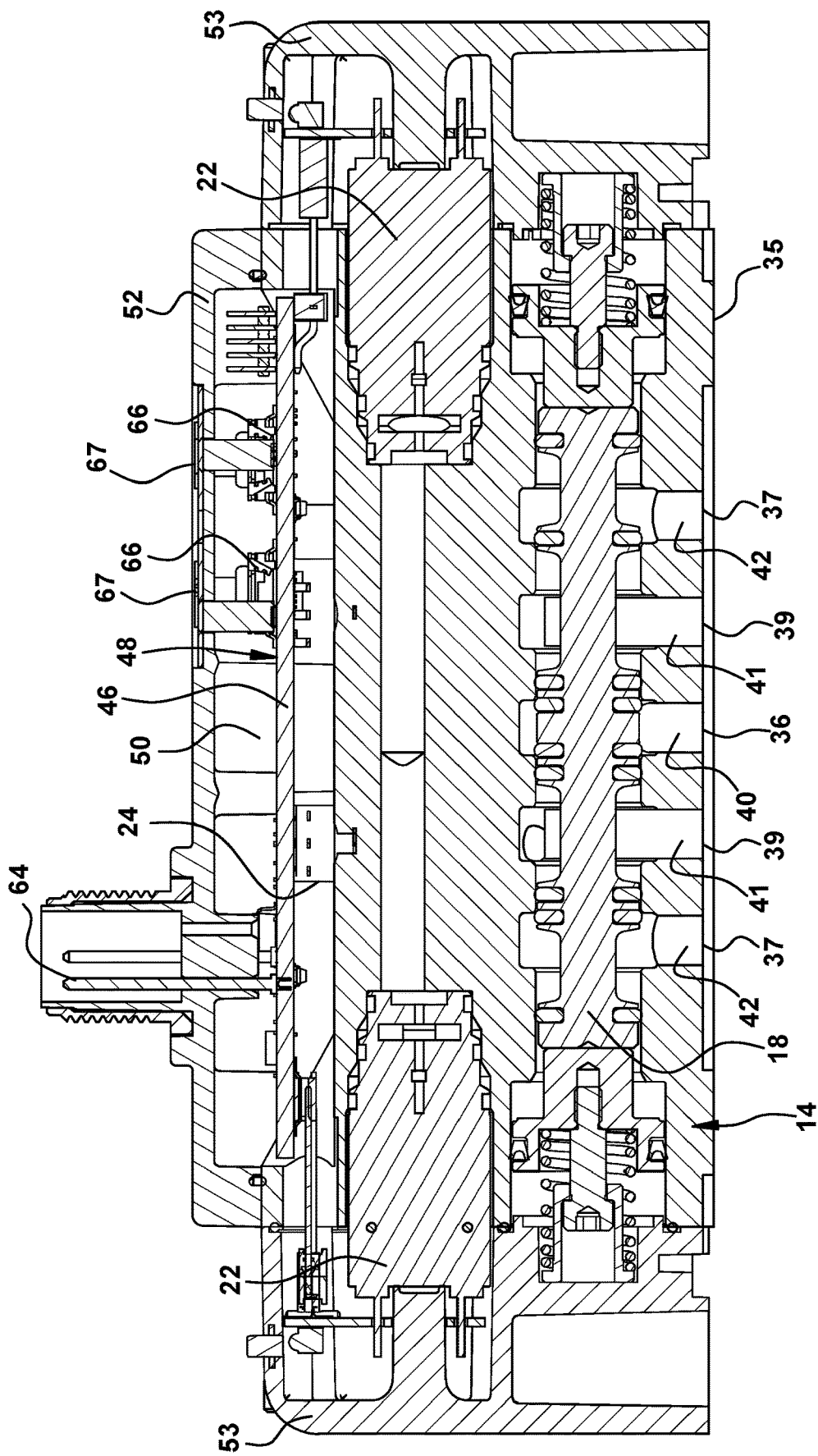
FIG. 8 is a cross-sectional side view of the modular control valve taken about the line A-A in FIG. 6.

Referring particularly to the cross-sectional view of FIG. 8, the valve body 14 includes at least one inlet passage 40 fluidly connected to the at least one inlet port 36, at least one outlet passage 41 fluidly connected to the at least one outlet port 37, and at least one fluid passage 42 fluidly connected to the at least one work port 39. One or more additional fluid passages may be formed in the valve body 14, which fluidly interconnect between the fluid passage(s) 40, 41, 42 to form a fluid flow path in the valve body 14. The valve member 18 is disposed in the valve body 14 and is movable in the fluid flow path and relative to the valve body 14 to control the flow of fluid passing through the valve body, such as between the inlet passage(s) 36 and outlet/work port passage(s) 41, 42.

In the illustrated embodiment, the control valve 12 is a directional control valve that controls (e.g., permits, restricts, meters, etc.) the fluid flow into different fluid passages of the valve body 14 based on a position of the valve member 18 in the valve body 14. The valve member 18 may be a slidable valve spool having a plurality of lands that cooperate with corresponding lands of the valve body 14 to control and/or direct such flow. As shown in FIG. 1, the fluid manifold 16 may have one or more work ports 44, such as on a front side thereof, for coupling the manifold 16 to an external fluid source and/or the external fluid operated device 26, such as a pneumatic piston-cylinder, for example. The work ports 44 of the fluid manifold 16 are fluidly connected to the work ports 39 of the valve body 14. In this manner, based upon the control of the fluid through the valve body 14 by the valve member 18, the fluid may exit or enter the fluid manifold 16 via the work ports 44 to actuate the fluid-operated device 26.

Figure 9:
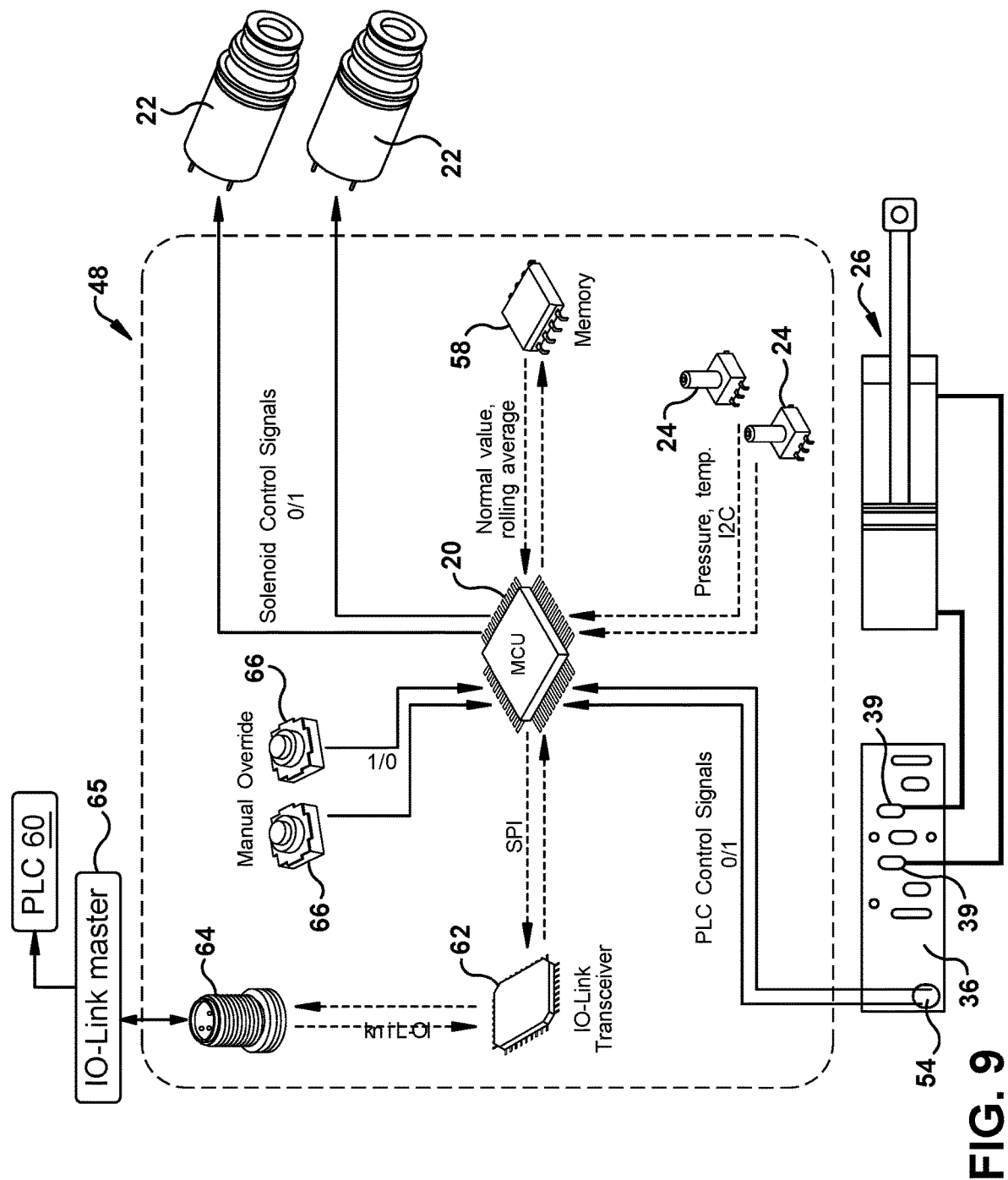
FIG. 9 is a schematic view of exemplary onboard electronics of the modular control valve, including an exemplary onboard electronic controller, which the electronics are shown operably connected to peripheral components.

Referring particularly to FIGS. 8 and 9, the onboard electronic controller 20 may include any suitable device for processing data, including by way of non-limiting example a programmable processor or multiple processors, such as microprocess(s). The onboard electronic controller 20 (also referred to as controller 20 or onboard controller 20) may include, in addition to hardware, code that creates an execution environment for control logic. In exemplary embodiments, the controller 20 is included in an electrical circuit 46, such as a printed circuit board, collectively referred to herein (along with other electrical components and/or connected circuits) as electronics 48. As shown, the electronics 48, including the controller 20, are operably mounted to the valve body 14, such as in a space 50 in a housing portion of the valve body 14. The housing portion of the valve body 14 may include a cover 52, which may seal the space 50 from the external environment to prevent moisture or other environmental effects from damaging the electronics 48. It is understood that other mounting locations of the controller 20 and/or electronics 48 are possible, provided the onboard controller 20 can be carried by the valve body 14, which said valve body 14 may include other parts or portions operably coupled to the main body having the fluid flow path, such as end caps 53, housing cover 52, or the like.

The at least one actuator 22 may include any suitable actuator or combination of actuators configured to move the valve member 18 relative to the valve body 14 to thereby control flow. The actuator(s) 22 may be operably connected to the valve member 18 in any suitable manner. The actuator(s) 22 also is operably connected to the controller 20. As an example, the actuator(s) 22 may include solenoid, smart material actuators such as piezoelectric actuator, electroactive polymer (EAP), or the like. In the illustrated embodiment the actuator 22 includes one or more solenoids 22 that are operably coupled to the valve member 18 in a well-known manner to those having ordinary skill in the art. The solenoids 22 may be powered by an external power source and may receive signals for control via an electrical connector(s) 54. The solenoids 22 also are operably coupled to the controller 20 via electrical connectors 55, such pin-socket connectors. The connectors 55 are electrically connected to the circuit 46 containing the controller 20. The actuator 22 is configured to control movement of the valve member 18 in response to commands that are received, directly or indirectly, from the controller 20.

In exemplary embodiments, the modular control valve 12 and/or the valve bank 10 may include one or more sensors 24 that are configured to sense a characteristic of at least one of the valve body 14, the valve bank 10 generally, or an associated device (e.g., fluid-operated device 26). In the illustrated embodiment, the one or more sensors 24 are included in the control valve 12, so as to provide an enhanced plug-and-play operation by incorporating the control valve 12 into the valve bank 10. The sensor(s) 24 may be any suitable sensor(s) for sensing any desirable characteristic of the fluid and/or of the mechanical operation of the control valve 12, valve bank 10, or other device.

As shown in FIG. 9, the sensor(s) 24 are operably coupled to the onboard controller 20 to communicate information corresponding with the sensed characteristic to the controller 20 for processing thereof. The electronics 48 (e.g., printed circuit board 26 and/or other suitably connected circuits) typically will include associated input and output circuits for interfacing with the sensors 24 and the controller 20 for controlling the valve 12 based upon information in the form of signals received from the sensors 24. This information received from the sensor(s) 24 may be used directly by the onboard controller 20 to control operation of the control valve 12, such as in a standalone operation; and/or the information received by the sensor(s) 24 may be used indirectly by the onboard controller 20, such as when such information (pre- or post-processed) is relayed to an upper level control, such as a PLC control, as described in further detail below.

In exemplary embodiments, the sensor(s) 24 are configured to sense a characteristic of the fluid, either directly or indirectly. In the illustrated embodiment, for example, two pressure sensors 24 are provided, which are disposed in fluid ports 56 on an upper face of the valve body 14 (see e.g., FIG. 7). The fluid ports 56 are fluidly connected via passages (hidden from view) to the fluid flow path of the valve body 14 for sensing pressure characteristics of the fluid. Alternatively, or additionally, suitable temperature sensor(s) may be provided in the fluid port(s) 56 or in other portions of the valve body for sensing temperature characteristics of the fluid. In exemplary embodiments, the temperature sensor(s) may be integrated into the pressure sensor(s). The sensors 24 (e.g., pressure and/or temperature) may be configured to sense characteristics of the fluid internal to the valve body 14. Alternatively, or additionally, such sensor(s) 24 disposed in the valve body 14 may be configured to sense characteristics received from other portions of the valve bank 10 (such as adjacent control valves, fluid manifold(s), upstream or downstream portions of the valve bank 10, or the like). In this manner, installation of the exemplary smart control valve 12 into a conventional valve bank, for example, can significantly enhance the capability of the valve bank 10 as a whole. It is also understood that other suitable sensor(s) 24 may be employed, such as valve positional sensors, for example, which may also be used to provide information to the onboard electronic controller 20 for diagnostic and/or feedback control.

In exemplary embodiments, the electronics 48 may include a memory device 58, which may be disposed on the printed circuit board. Generally, the onboard controller 20 is operably coupled to the memory device 58 to send or receive data for storage thereof. The memory device 58 may be a mass storage device, a read-only memory or a random access memory or both. Such a memory device 58 suitable for storing data (such as computer program instructions or information received from the sensor(s)) may include any suitable form of non-transitory computer-readable medium, including by way of examples semiconductor or magnetically encoded memory devices.

The electronics 48 also may be provided with one or more communications interfaces for transmitting and receiving information to or from an external controller or other device, such as an upper level programmable logic controller (PLC) 60. To this end, the electronics 48 (e.g., circuit 46) may be provided with an electrical transceiver 62. The electrical transceiver 62 is operably coupled to the onboard controller 20, such as via a serial peripheral interface (SPI), and is configured to communicate information from the controller 20, such as processed information received from the sensor(s) 24, to the external PLC 60. The connection to the PLC 60 may be made via an outwardly addressable electrical connector 64, and/or the connection may be made via the electrical connector 54. For example, in some embodiments, the connector 64 is used to power the electronics 48 and communication to and from the PLC 60, while the PLC command signals to control the valve member 18 via the solenoids 22 is via the connector 54. In alternative embodiments, the connector 64 is used to power the electronics 48 and communication to and from the PLC 60 as well as receive the PLC command signals to control the valve member 18 via the solenoids 22. In yet other embodiments, the connector 54 is used for powering the electronics 48, communicating with the PLC 60 as well as receive command signals from the PLC 60. In exemplary embodiments, the transceiver 62 may be an IO-link transceiver operably coupled to an IO-interface connector via an IO-link, as shown in the illustrated embodiment. The IO-interface connector may connect to an IO-link master 65, which then connects to the PLC 60. Alternatively, or additionally, such communication of the transceiver 62 can be affected wirelessly using conventional wireless communication means, such as a wireless LAN, Bluetooth, NFC, or the like. Alternatively, or additionally, the communication may be made through a CAN bus disposed within the manifold 16, such as when the connector 54 is used.

In a well-known manner, the PLC 60 may be an industrial digital computer which has been ruggedized and adapted for the control of manufacturing processes, such as assembly lines, or robotic devices, or other suitable activity that may require high reliability control and ease of programming and process fault diagnosis. The electrical transceiver 62 is configured to receive and transmit commands from the PLC 60 to the onboard electronic controller 20, in which the onboard controller 20 may control movement of the valve member 18 via the actuator 22 based upon the commands received from the PLC 60. These commands from the PLC 60 may be based upon the information received by the onboard controller 20 from the sensor(s) 24 that was previously relayed to the PLC 60. Alternatively, or additionally, the onboard controller 20 may provide standalone functionality to assess the state of the valve 12 and command control of the valve member 18, such as when commanded to do so by the PLC 60.

The electronics 48 (e.g., circuit 46) also may include one or more electrical switches 66 that are configured to bypass or manually control the commands of the onboard controller 20 to provide a manual override functionality for movement of the valve member 18. The electrical switches 66 may be operably coupled to one or more externally depressible buttons 67, such as on outward top face of the valve body 14, to enable actuation thereof by a user.

Referring to FIGS. 10A-17, various exemplary and non-limiting configurations of the valve member 12 are shown in further detail. As discussed above, the valve member 12 may be any suitable valve member such as for use with a valve bank 10, and thus it is understood that certain structures and features of the control valve 12 are common to the other types of control valves, as would be understood by those having ordinary skill in the art. Consequently, the same reference numerals are used to denote structures corresponding to the same or similar structures in the control valves.

Figure 15:
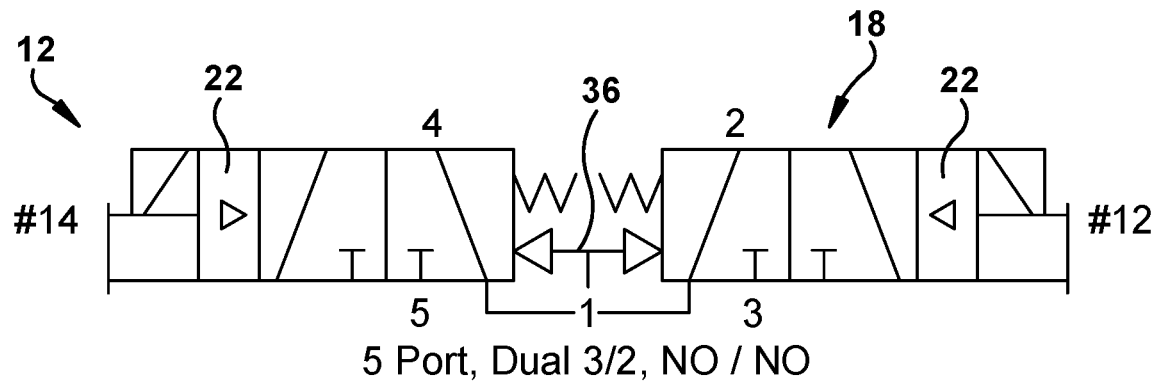
FIG. 15 is a schematic circuit diagram of another exemplary modular control valve.
Figure 16:
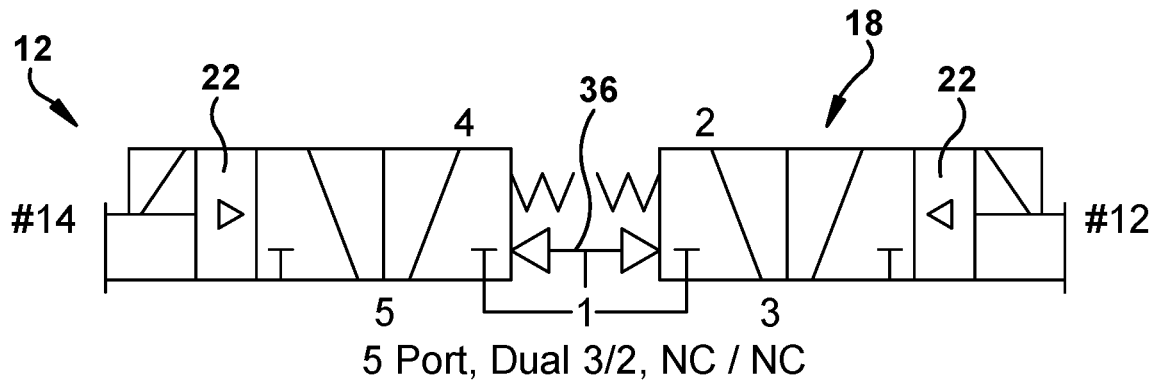
FIG. 16 is a schematic circuit diagram of another exemplary modular control valve.
Figure 17:
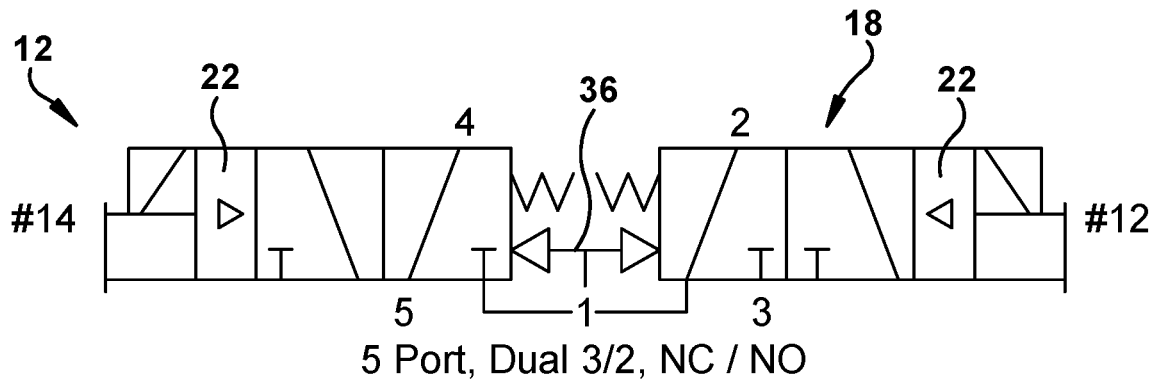
FIG. 17 is a schematic circuit diagram of another exemplary modular control valve.

FIG. 10A is a schematic circuit diagram (e.g., hydraulic or pneumatic) of the exemplary control valve shown in FIG. 8, which is a three position all ports blocked configuration of the control valve. FIG. 10B is a sectional view of FIG. 10A showing the valve member in the valve body. FIG. 11A is a schematic circuit diagram (e.g., hydraulic or pneumatic) of a two position single solenoid spring/air return configuration of the control valve. FIG. 11B is a sectional view of FIG. 11A. FIG. 12A is a schematic circuit diagram (e.g., hydraulic or pneumatic) of a two position double solenoid configuration of the control valve. FIG. 12B is a sectional view of FIG. 12A. FIG. 13 is a schematic circuit diagram (e.g., hydraulic or pneumatic) of a three position center exhaust configuration of the control valve. FIG. 14 is a schematic circuit diagram (e.g., hydraulic or pneumatic) of a three position pressure center configuration of the control valve. FIG. 15 is a schematic circuit (e.g., hydraulic or pneumatic) diagram of a 5 port, dual 3/2, NO/NO split spool configuration of the control valve. FIG. 16 is a schematic circuit diagram (e.g., hydraulic or pneumatic) of a 5 port, dual 3/2, NC/NC split spool configuration of the control valve. FIG. 17 is a schematic circuit diagram (e.g., hydraulic or pneumatic) of a 5 port, dual 3/2, NC/NO split spool configuration of the control valve.

As described above with exemplary reference to FIGS. 8 and 9, the onboard controller 20 provides numerous advantages such as improved diagnostics and/or feedback of the control valve 12 and/or valve bank 10. More particularly, the exemplary control valve 12 may provide for one or more of the following advantageous features. For example, the onboard controller 20 may be configured to receive information from the one or more sensors 24, which may enable improved operation and capability of the control valve 12 and/or the valve bank 10 as a whole. Such a system may significantly enhance the tailorability of the valve bank 10 by use of such a modular control valve 12. Such a modular control valve 12 may minimize the complexity of the valve bank 10 by reducing or eliminating the need for an intermediate external controller mounted to the valve bank for communication to an upper level PLC control; and instead may provide for direct communication from the onboard controller 20 to the PLC 60 for relaying the diagnostics and/or feedback associated with the control valve 12 and/or other portions of the valve bank 10, or other suitably connected devices. In exemplary embodiments, the onboard controller 20 only controls the individual valve member(s) 18 associated with the valve body 14 on which the onboard controller 20 is mounted, which also may reduce or eliminate the need for an intermediate external controller that controls multiple control valves. Such a modular control valve 12 may be used with conventional non-intelligent valve banks to thereby impart smart diagnostics and/or feedback into the valve bank in a plug-and-play manner simply via modular installation of the control valve 12, optionally with additional communication (wired or wireless) to the PLC controller 60. Alternatively, or additionally, the modular control valve 12 may enable standalone diagnostics, feedback and/or control of the valve 12.

Generally, the exemplary control valve 12 may provide feedback associated with temperature and/or pressure of the fluid from respective temperature and/or pressure sensors 24. Alternatively, or additionally, other suitable sensors, such as positional sensors of the valve member, may provide feedback as well. The sensor arrangement of the control valve 12 is not limited to these sensor(s), and other suitable sensor(s) also may be employed. Generally, the feedback provided by the sensor(s) 24 may include: load sensing, load control, temperature sensing, and/or speed control, for example. Generally, the diagnostics provided by the sensor(s) 24 may include leakage detection, sluggish spool shifting (e.g., solenoid or valve member response time), stroke time, short and open circuit detection, load holding monitoring, and/or cycle count, for example. Other suitable feedback and/or diagnostics also may be provided as may be desired, as would be understood by those having ordinary skill in the art.

Generally, an exemplary logical operation of an algorithm executed in the onboard controller 20 may be as follows. The onboard controller 20 may determine when to send a signal to the actuator(s) 22, when to send an off signal to the actuator(s) 22, or when to send specific information to the PLC controller 60. Inputs into the onboard controller 20 may include: (i) pressure signals from the one or more pressure sensors 24; (ii) temperature signals from the one or more temperature sensors 24; (iii) PLC control signals via the electrical connector (e.g., 54 or 64); (iv) control signals from the manual override push buttons 66; (v) configuration settings from the PLC controller 60; and/or (vi) reset signals from the PLC controller 60. Outputs from the electronic controller 20 may include: (i) control signals to the actuators 22, including PWM power reduction; (ii) cyclical data to the PLC controller 60, such as at predefined intervals; and/or (iii) information as requested by the PLC controller commands, which may be associated with pressure, temperature, actuator/valve member cycles, actuator/valve member response times, etc.

Generally, the memory 58 may store data associated with any number of instructions or variables, including: (i) valve function type; (ii) actuator control signal sources (e.g., one-solenoid, two-solenoid, etc.); (iii) normal operating conditions, such as (a) actuator response time thresholds, (b) fluid-operated device (e.g., cylinder piston) response time thresholds, (c) fluid-operated device (e.g., cylinder piston) travel time, (d) leakage rate, (e) pressure differentials such as between two pressure sensors in the valve body, between the pressure sensed in the valve body having the onboard controller and another portion of the valve bank (e.g., another control valve), and/or piston-cylinder chambers in the fluid operated device, for example; (iv) rolling averages of data collected, including: (a) actuator response time, (b) fluid-operated device response time, (c) fluid-operated device travel time, (d) pressure differentials, such as those stated above.

In exemplary embodiments, the modular control valve 12 may be configured such that one byte of data may be used to set the valve function which may be stored in the memory 58. In some embodiments, the control valve 12 may be a "fixed function" valve that may be set by the valve manufacturer. In other embodiments, the control valve 12 may be a "configurable operation" valve that can be reconfigured by the end user. One bit of data may be used to set a control signal source. In some embodiments, the control signal source may be communicated through the electrical connector 54 for the solenoid. In some embodiments, the control signal source may be communicated through the outwardly addressable electrical connector 64, such as via an M12 connector.

In an exemplary manual override mode of operation, the modular control valve 12 may operate as follows. Generally, there may be two types of manual overrides. The first type may be a non-locking manual override, in which the manual actuation (e.g., via the buttons and switches operating the actuators) is momentary (e.g., valve member is deenergized once force is removed). In this first type, the manual override button 66 may be pushed and held for as long as needed. The second type may be a locking manual override, in which the manual actuation is a latching function (e.g., valve member remains energized even if force is removed). In this second type, the manual override button 66 may be pushed then released twice within a preset period (e.g., 1 second).

Generally, the manual override function will be enabled by setting the onboard controller 20 by one parameter bit. Once the manual override is enabled, pushbuttons 66 will be able to change the states of two process bits. Bit state change will then trigger corresponding solenoid states to change according to logic/algorithm executed by the controller. To distinguish between the two type of manual overrides, the onboard controller 20 may need to start counting time once the "0" to "1" change occurs, in addition to changing corresponding solenoid states immediately according to the above description. In the non-locking type, if the pushbutton state changes from "1" to "0" within a preset (e.g., 1 second) time frame, the solenoid will stay in actuated mode until the preset time is reach. After this preset time, the solenoid states return to un-actuated mode. For the locking type, if during that preset timeframe, after the first "1" to "0" event, there is another "0" to "1" then "1" to "0" event, solenoids will stay in actuated mode after the preset time, even if the state of the pushbutton is "0". To de-energized, the same two "push then release" motion within the preset time may be required. Such as sequence generally may require the onboard controller 20 to remember or recall from memory 58 that the valve is "manual override" actuated. Even if the manual override is enabled, the PLC 60 will still be able to change the state of the valve 12 via electrical plug 54 such as at bottom of the valve. If the valve member 18 already is actuated by manual override (both types), de-energized signal(s) from the PLC 60 will be ignored.

Turning to FIGS. 18-24, flow diagrams illustrating exemplary control logic for various operations of the onboard controller 20 of the exemplary control valve are shown. Exemplary non-limiting control logic routines that may be processed by the onboard controller include one or more of: (i) leakage check function using pressure decay; (ii) actuator response time; (iii) fluid-operated device response time; (iv) load condition sensing; (v) stroke time of fluid operated device and/or valve member; (vi) jammed fluid-operated device detection; (vii) dynamic leak check; (viii) cushion check; (ix) load hold monitoring; (x) short and open circuit detection; (xi) high and low temperature detection; and (xii) monitoring adjacent control valves. FIG. 25 is an x-y plot diagram illustrating experimental results of pressure versus time, and which shows an exemplary operation of the valve 12 indicating where such operational functions may be observed or may be employed, as described in further detail below. In the illustrated diagram of FIG. 25, the dotted lines toward the top indicate supply pressure across various load conditions, and the solid lines toward the bottom indicate exhaust pressure across the corresponding load conditions.

Figure 18:
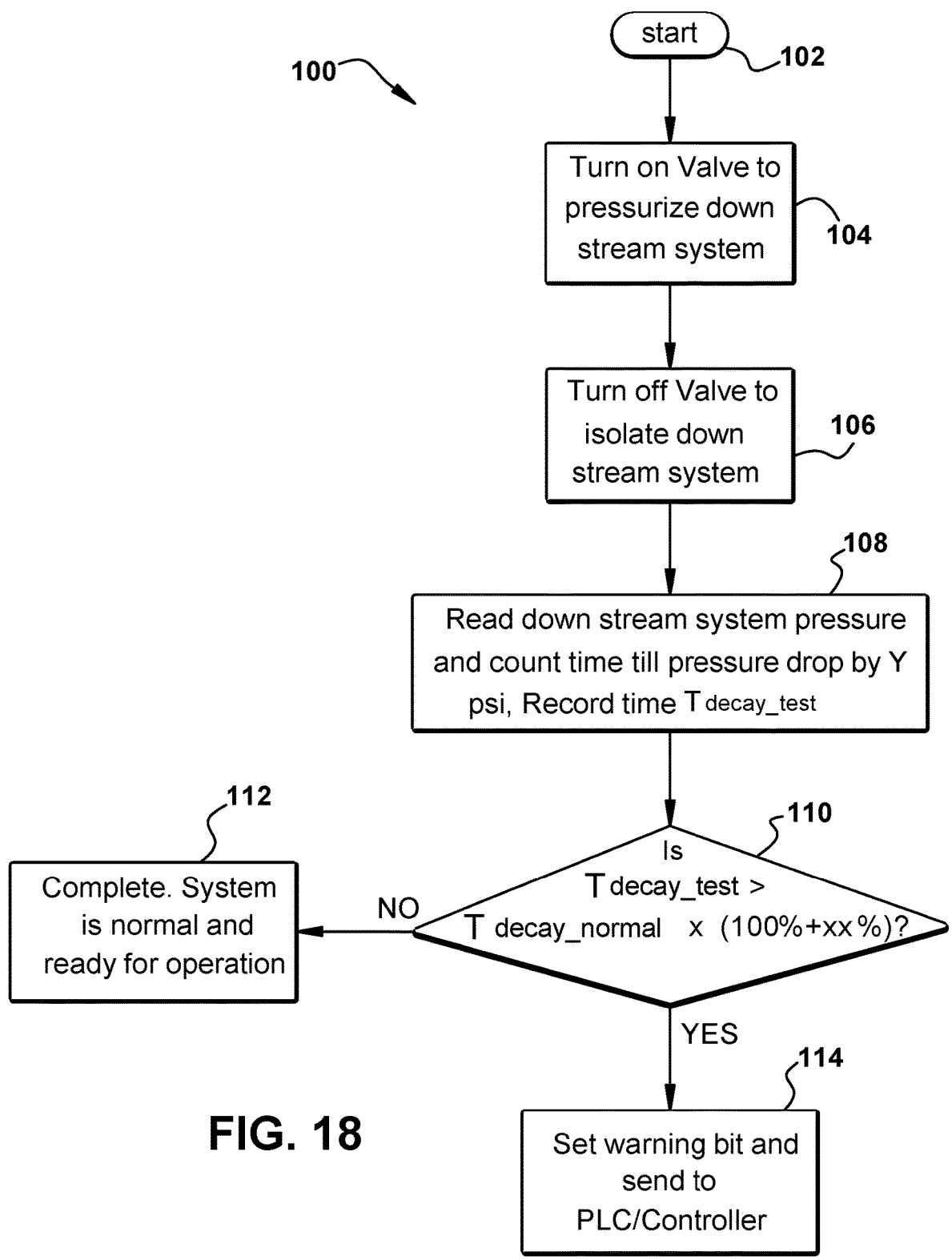
FIG. 18 is a flow diagram illustrating an exemplary control algorithm routine by the onboard controller for leakage check function.

Referring initially to FIG. 18, a flow diagram illustrating an exemplary control algorithm routine 100 of leakage check function is shown using a pressure decay method. This method 100 may be performed periodically to ensure downstream system flow has less than certain amount of leakage, when the system is not running. This routine 100 generally will be available with APB (all port blocked) type valves. The downstream system (includes tubes, fittings, cylinder, etc.) will first be pressured by turning on the valve. The completion of pressurization is indicated by the same pressure readings on both pressure sensors (+/-2%). Once the pressurization is complete, de-energized the APB type of valves will let the control member return to center position, which will isolate downstream system from both supply and exhaust ports. The pressure changes of the pressure sensor (e.g., downstream side in the valve) will then be monitored over time. The time for the pressure to drop to a certain value will be compared to stored "normal condition" value to determine if the downstream system has excessive leakage. If normal (within +/-10%, for example 2 psi in 5 minutes), set "system leakage test OK" bit to 1. If time is shorter than "normal condition" by 25%, set "system leakage warning" bit to 1. If time is shorter than "normal condition" by 50% (e.g., pressure drop too fast, such as 2 psi in 1 minute), set "system excessive leakage, maintenance required" bit to 1. It is understood that the foregoing values are exemplary, and other suitable values may be used as would be understood by those having ordinary skill in the art.

More particularly, with exemplary reference to FIG. 18, the exemplary method 100 of leakage check function using a pressure decay method may begin prior to step 102, with a set of pre-conditions. Such preconditions may include: (i) the specific type of valve (e.g., APB (All Port Blocked) valve only); (ii) the normal condition Tdecay_Normal (pressure decay time to drop by Y psi) has been stored; and (iii) percentage of deviation from normal condition has been determined (xx %). At step 102 the process begins. At step 104, turn on valve to pressurize downstream system. At step 106, turn off Valve to isolate downstream system. At step 108, read downstream system pressure and count time till pressure drop by Y psi, Record time Tdecay_test. At step 110, determine if Tdecay_test>Tdecay_normal×(100%+xx %). If no at step 110, at step 112 operation complete, system is normal and ready for operation. If yes at step 110, set warning bit and send to PLC controller.

Figure 19:
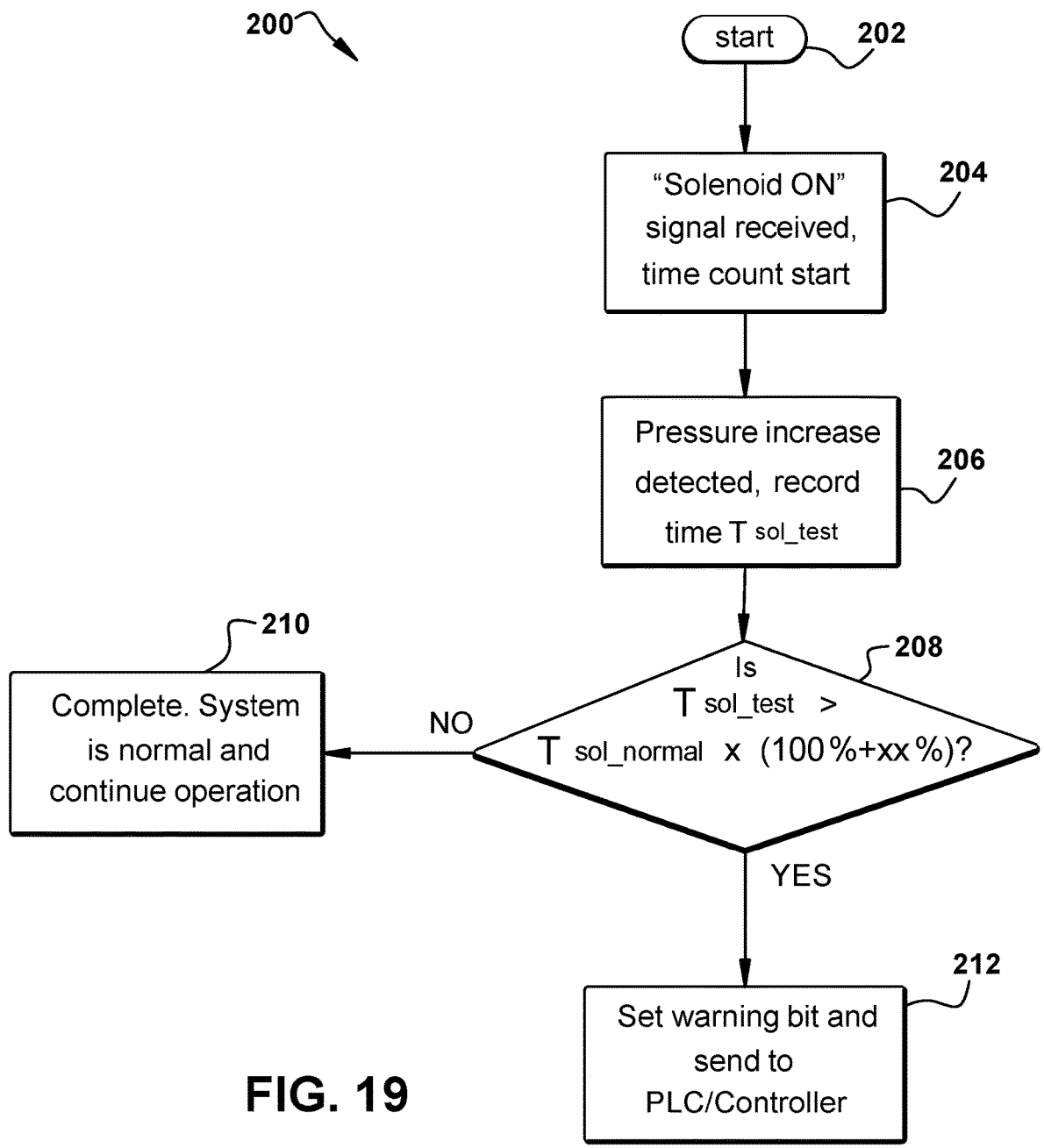
FIG. 19 is a flow diagram illustrating an exemplary control algorithm routine by the onboard controller for solenoid response time.

Referring to FIG. 19, a flow diagram illustrating an exemplary control algorithm routine 200 for solenoid response time is shown. This method may be done every time solenoid is turned on or off. This routine generally may be available for all valve types and functions. Referring to FIG. 25, solenoid response time may be defined as the time between control signal and pressure start to rise (see "A" in chart). This may require constant comparing of the pressure signal (rolling average of past 5 recordings) to stored pressure prior to the control signal. If the time is different by 50% when compared with stored "normal response time, set "slow solenoid response" bit to 1. If the time is different by 100% when compared with stored "normal response time), set "slow solenoid response, maintenance required" bit to 1. It is understood that response time ("on" and "off") may be a function of pilot pressure, so a look up table may be required to determine "normal response time" for certain pressure ranges. It is understood that the foregoing values are exemplary, and other suitable values may be used as would be understood by those having ordinary skill in the art.

More particularly, with exemplary reference to the flow diagram of FIG. 19, the exemplary method 200 may begin prior to step 202, with a set of pre-conditions. Such preconditions may include: (i) normal condition Tsol_Normal (Average solenoid response time) has been stored; (ii) percentage of deviation from normal condition has been determined (xx %); (iii) solenoid is off, pressure is zero. At step 202, the routine begins. At step 204, "Solenoid ON" signal received, time count start. At step 206, pressure increase detected, record time Tsol_test. At step 208, determine if Tsol_test>Tsol_normal×(100%+xx %). If yes at step 208, at step 210 operation is complete, system is normal and continue operation. If no at step 208, set warning bit and send to PLC controller.

Figure 20:
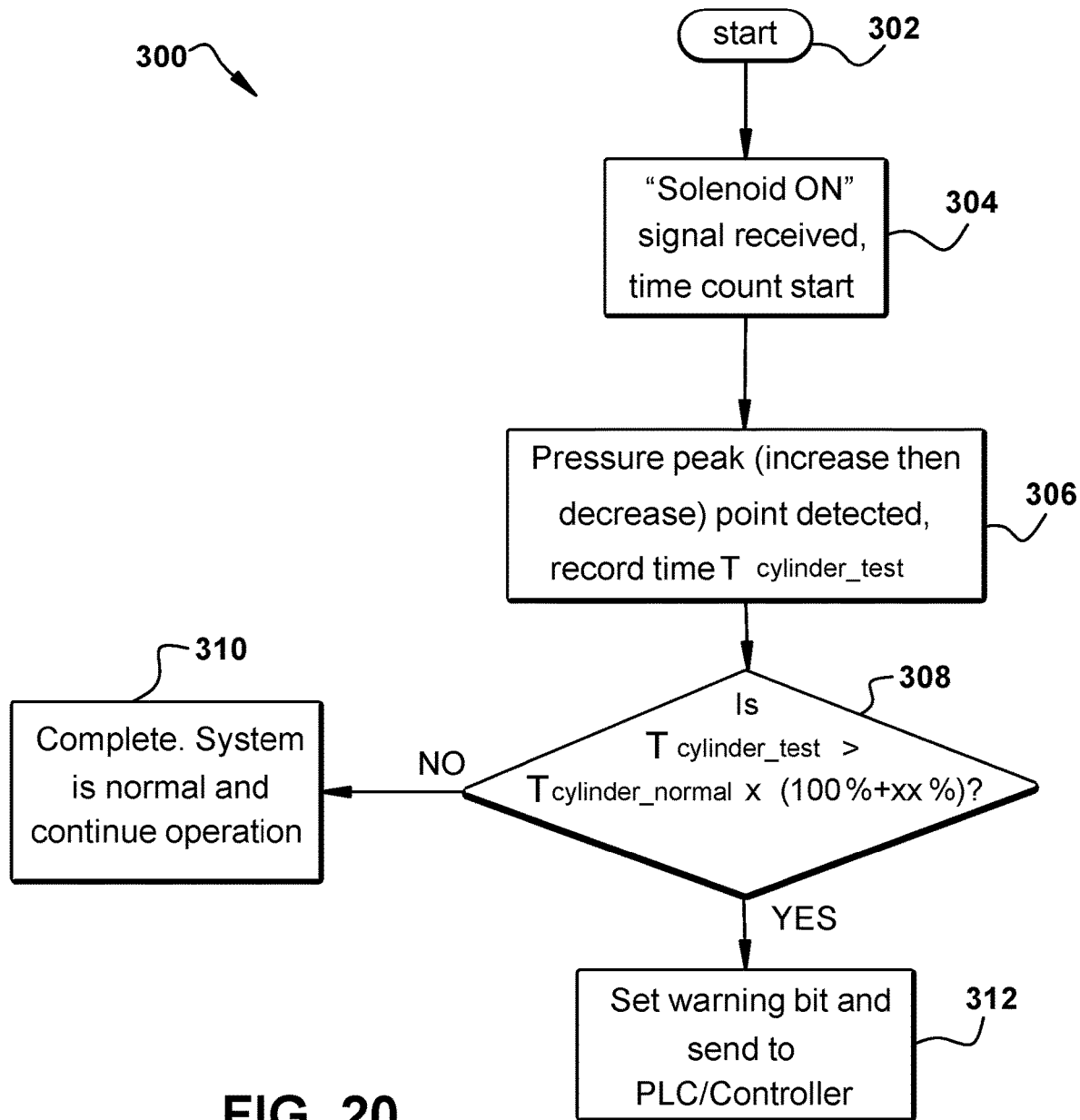
FIG. 20 is a flow diagram illustrating an exemplary control algorithm routine by the onboard controller for cylinder response time.

Referring to FIG. 20, a flow diagram illustrating an exemplary control algorithm routine 300 for cylinder response time is shown. This may be done every time solenoid is turned on or off. This routine generally may be available for all valve types and functions. Referring to FIG. 25, cylinder response time may be defined as the time between control signal and the time cylinder piston start to move (see "B" in chart). This may require calculating pressure rate of change. In such calculation, a rolling average of the 5 past readings (e.g., 2 ms each) may be compared to a prior rolling average. If the pressure change direction (increase or decrease) has been reversed consecutively for 3 rolling average readings, record the time. If the time is greater than stored "normal cylinder response time" by 50%, set "slow cylinder response" bit to 1. If the time is greater than stored "normal cylinder response time" by 100% set "slow cylinder response, maintenance required" bit to 1. It is understood that response time (on and off) may be a function of supply pressure, so a look up table might be required to determine "normal response time" for certain pressure ranges. It is understood that the foregoing values are exemplary, and other suitable values may be used as would be understood by those having ordinary skill in the art.

More particularly, with exemplary reference to the flow diagram of FIG. 20, the exemplary method 300 may begin prior to step 302, with a set of pre-conditions. Such preconditions may include: (i) normal condition Tcylinder_Normal (Average cylinder response time) has been stored; (ii) percentage of deviation from normal condition has been determined (xx %); (iii) solenoid response time has been detected. At step 302, the process may begin. At step 304, "Solenoid ON" signal received, time count start. At step 306, pressure peak (increase then decrease) point detected, record time Tcylinder_test. At step 308, determine if Tcylinder_test>Tcylinder_normal×(100%+xx %). If no at step 308, at step 310 operation is complete, system is normal and continue operation. If yes at step 308, at step 312 set warning bit and send to PLC controller.

Figure 21:
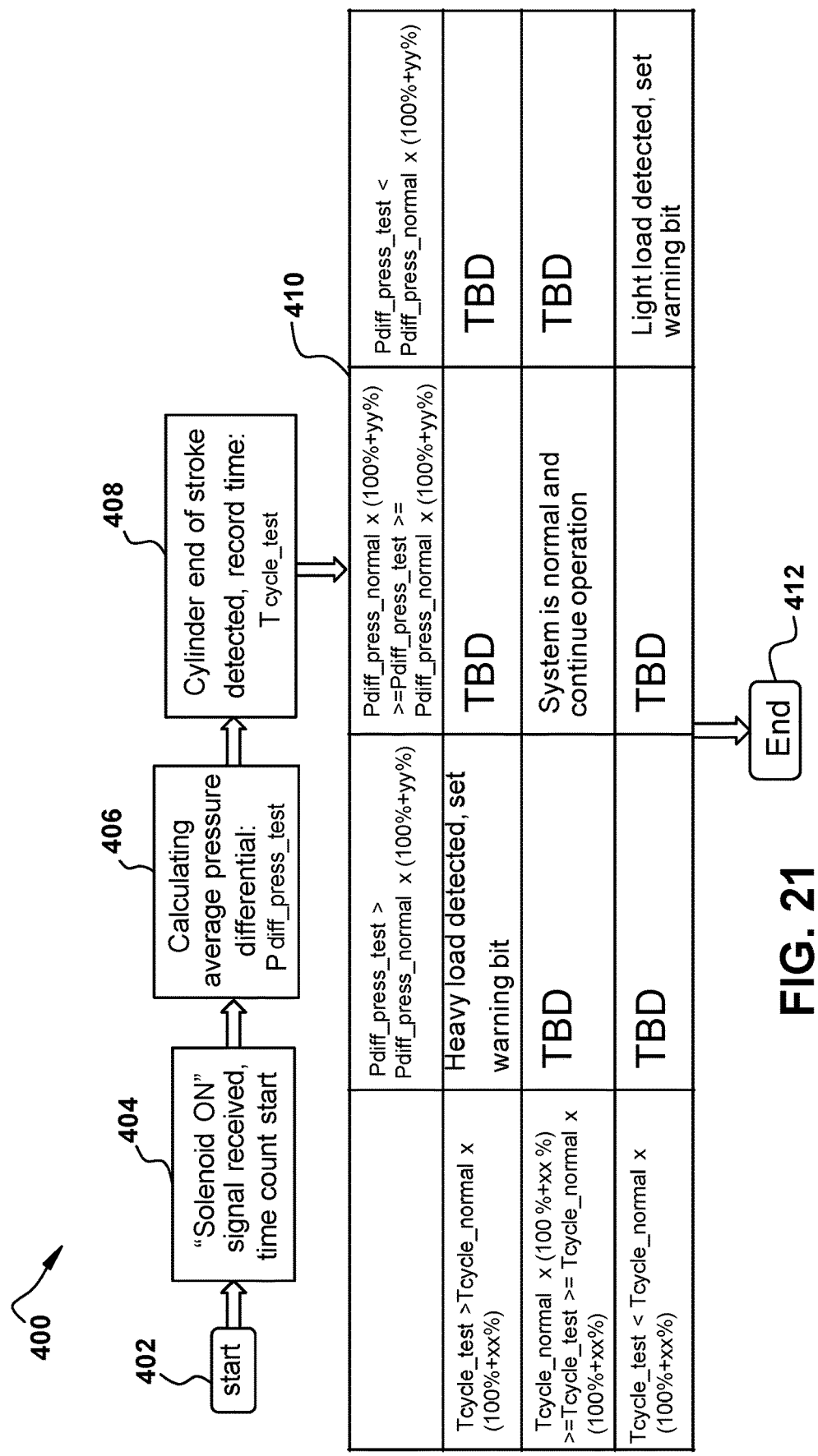
FIG. 21 is a flow diagram illustrating an exemplary control algorithm routine by the onboard controller for load condition sensing.

Referring to FIG. 21, a flow diagram illustrating an exemplary control algorithm routine 400 for load condition sensing is shown. Generally, the differential pressure between the two cylinder chambers of the piston-cylinder (e.g., fluid operated device) is what moves the piston/load. This can be easily calculated from two pressure sensor readings. By examining differential pressure magnitude and/or timing, load condition can be determined. Referring to FIG. 25, three different load conditions (0 lbs, 35 lbs, 70 lbs) are plotted. One approach is to store the entire pressure trace then compared with previously stored "normal traces" to determine any abnormal condition. Alternatively, only "normal value" pressure differential and cylinder travel time may be stored. The latter would be less demanding in terms of memory size and communication. The "normal traces" or "normal value" may be generated by "training" the valve after the downstream system is setup with known load. The training might require multiple runs with known load and supply pressure. The training may need to be conducted for every new condition (load and supply pressure) or could be predicted based on known values. It is understood that the foregoing values are exemplary, and other suitable values may be used as would be understood by those having ordinary skill in the art.

By way of example, if the piston-cylinder is to move a 100 kg load, with 100 psig supply pressure, the differential pressure is 30+/−5 psig, and the time is 1000+/−100 ms, as result of 20 training cycles. If on one occasion the differential pressure is 50 psig and time to stop is 1500 ms, then one can conclude that the load is heavier than 100 kg. A warning bit (heavy load) can be set to 1. In a different occasion, the differential pressure is 30 psig but the time to stop is 500 ms, then the cylinder is jammed. A warning bit (jammed cylinder) can be set to 1. On another occasion, the differential pressure is 20 psig and time to stop is 700 ms, then a lighter load is detected. A warning bit (light load) can be set to 1. Furthermore, by quantifying the time and differential pressure during training, even more accurate predication can be made. For example, with different differential pressure and time combination, the algorithm can predicate the load has been increased from 100 kg to 150 kg. It is understood that the term "load" here generally has two components: the actual load and cylinder friction. It is understood that the foregoing values are exemplary, and other suitable values may be used as would be understood by those having ordinary skill in the art.

More particularly, with exemplary reference to the flow diagram of FIG. 21, the exemplary method may begin prior to step 402, with a set of pre-conditions. Such preconditions may include: (i) the system has been trained for normal load condition: Pdiff_press_normal, Tcycle_normal have been stored; and (ii) percentage of deviation from normal condition has been determined (xx % for time and yy % for pressure). At step 408, the process begins. At step 404, "Solenoid ON" signal received, time count start. At step 406, calculating average pressure differential: Pdiff_press_test. At step 408, cylinder end of stroke detected, record time: Tcycle_test. At step 410, a lookup table may be provided to determine the condition based on the processed information (e.g., time v. pressure condition). At step 412, the process ends.

Figure 22:
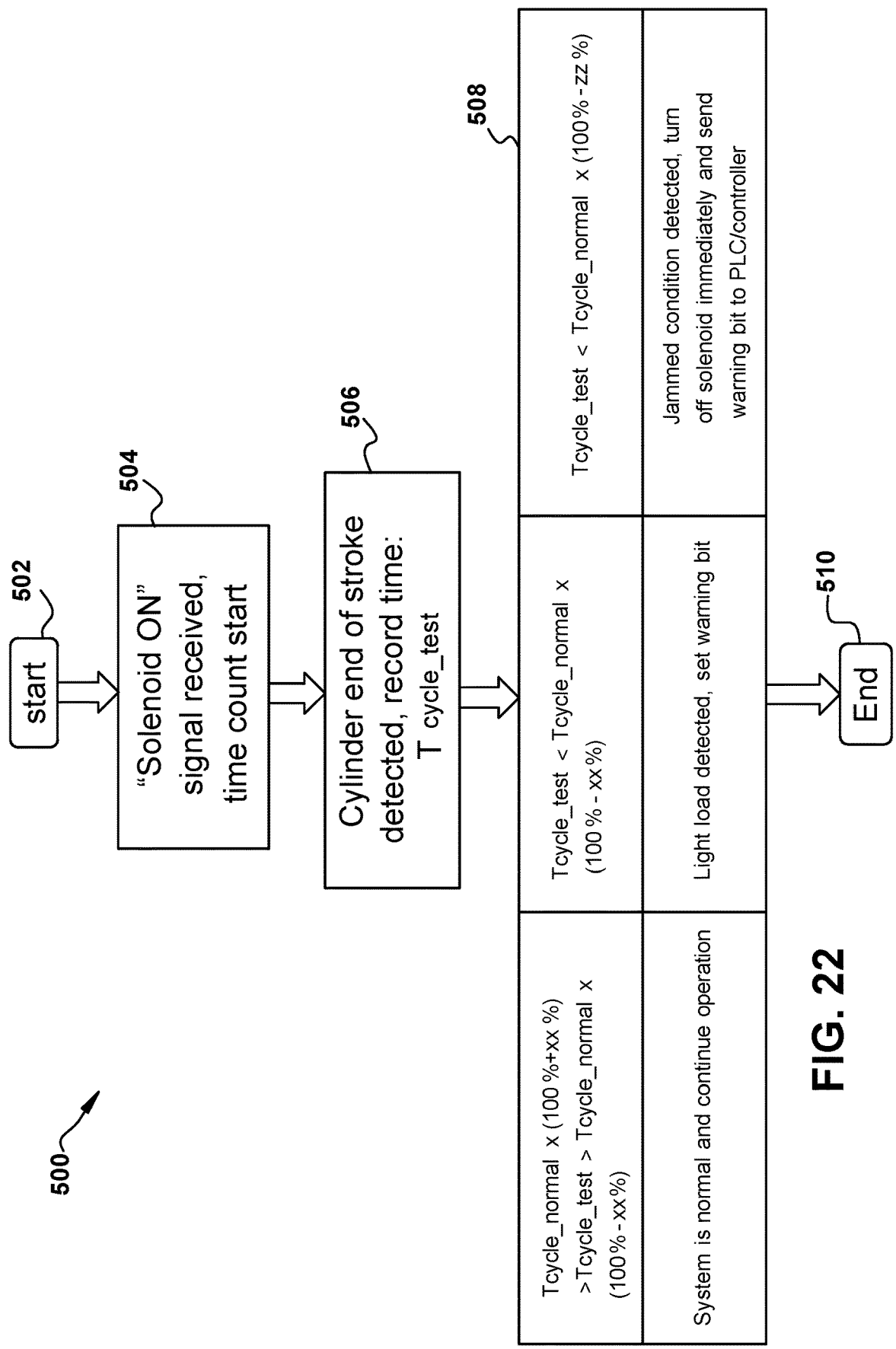
FIG. 22 is a flow diagram illustrating an exemplary control algorithm routine by the onboard controller for a jammed cylinder check.

Referring to FIG. 22, a flow diagram illustrating an exemplary control algorithm routine 500 for a jammed cylinder check is shown. In such a method, control logic by the onboard controller can be executed to retract a cylinder immediately when jammed, such as to avoid equipment damage. Compared with executing such logic in the PLC controller, time can be saved when executing upstream at the onboard controller 20. For example, assuming every 20 ms cyclical data will be read into/send from PLC/Controller, potentially 40 ms of time can be saved by eliminating the return time from the PLC. Examples of such jammed cylinder operation may be utilized for a cylinder operated door/gate, a pneumatic press, or the like. It is understood that the foregoing values are exemplary, and other suitable values may be used as would be understood by those having ordinary skill in the art.

More particularly, with exemplary reference to the flow diagram of FIG. 22, the exemplary method may begin prior to step 502, with a set of pre-conditions. Such preconditions may include: (i) the system has been trained for normal load condition: Tcycle_normal have been stored; (ii) Jammed condition: percentage of deviation from normal condition has been determined (zz %); (iii) Non-jammed condition: percentage of deviation from normal condition has been determined (xx %). At step 502, the process may begin. At step 504, "Solenoid ON" signal received, time count start. At step 506, Cylinder end of stroke detected, record time: Tcycle_test. At step 508, a lookup table may be provided to determine the condition based on the processed information (e.g., time condition). At step 510, the process ends.

In exemplary embodiments, an exemplary control algorithm routine for a dynamic leakage check may be provided (not shown). Referring to FIG. 25, a dynamic leakage check may be accomplished by comparing pressure traces or differential pressure value plus the piston travel time (as shown at "D" in the chart) compared to stored "normal traces" or "normal value." For a normal system (known load, all component leakage and response time), the differential pressure and piston travel time should be within a certain +/− range when compared with "normal." This process is similar to the "load condition sensing" method described above. However, the comparison results due to leakage is unique and different from load status change. For example, in a "heavy load" case, both pressure differential and piston travel time should be increased, hence the evaluation at location "D" on the chart. In a "light load" case, both pressure differential and piston travel time should be decreased. In "jammed cylinder" case, only piston travel time should be decreased.

Furthermore, since the pressure sensors may be located in the valve body and not at the cylinder chambers, further leakage source distinctions can be made. In both external and internal leakage cases, pressure differential will be decrease and piston travel time will be increased, but with below differences: (i) If it is external leakage (leakage from valve to base gasket, fittings, tubes etc.), pressure reading from "pressure side" of the piston should be lower; and (ii) if it is internal leakage (leakage from across piston seal), pressure reading from "exhaust side" of the piston should be higher. Therefore, potentially two warning bits can be assigned: (i) "excess external leakage" and (ii) "excess piston seal leakage."

In exemplary embodiments, an exemplary control algorithm routine for cushion check may be provided (not shown). FIG. 25 illustrates operation without cushion. With cushion, one would expect the end of piston travel ("C" in chart) will have an "ease in" period. The "ease in" period can then be compared with stored "normal value" to determine if the cushion needs to be replaced, repaired or re-adjusted. Accordingly, in exemplary embodiments a warning bit of "check cushion" can be set to 1.

Figure 23:
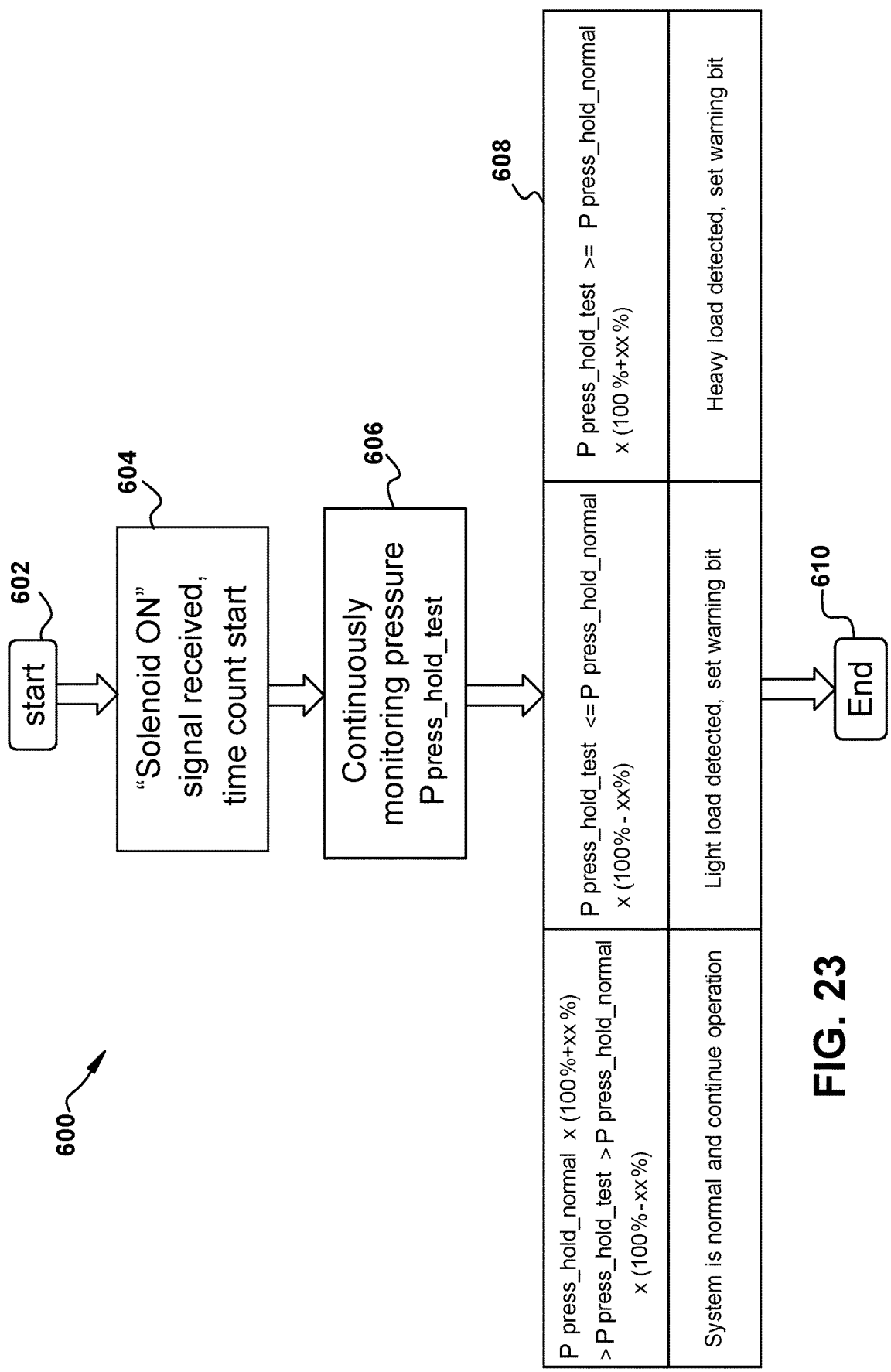
FIG. 23 is a flow diagram illustrating an exemplary control algorithm routine by the onboard controller for load hold monitoring.

Referring to FIG. 23, a flow diagram illustrating an exemplary control algorithm routine 600 for load hold monitoring is shown. Generally, for load holding applications (wielding, press, clamp, hold, etc.), pressure variations during holding period can be recorded. These recorded values can be compared to stored "normal values" to determine if the load holding is acceptable or needs to be rejected. The stored data (which may be relayed back to PLC controller) can then later be used for traceability purposes.

More particularly, with exemplary reference to the flow diagram of FIG. 23, the exemplary method may begin prior to step 602, with a set of pre-conditions. Such preconditions may include: (i) Normal condition Ppress_hold_normal has been stored; (ii) Percentage of deviation from normal condition has been determined (xx %). At step 602, the process may begin. At step 604, "Solenoid ON" signal received, time count start. At step 606, Continuously monitoring pressure Ppress_hold_test. At step 608, a lookup table may be provided to determine the condition based on the processed information (e.g., pressure condition). At step 610, the process ends.

Figure 24:
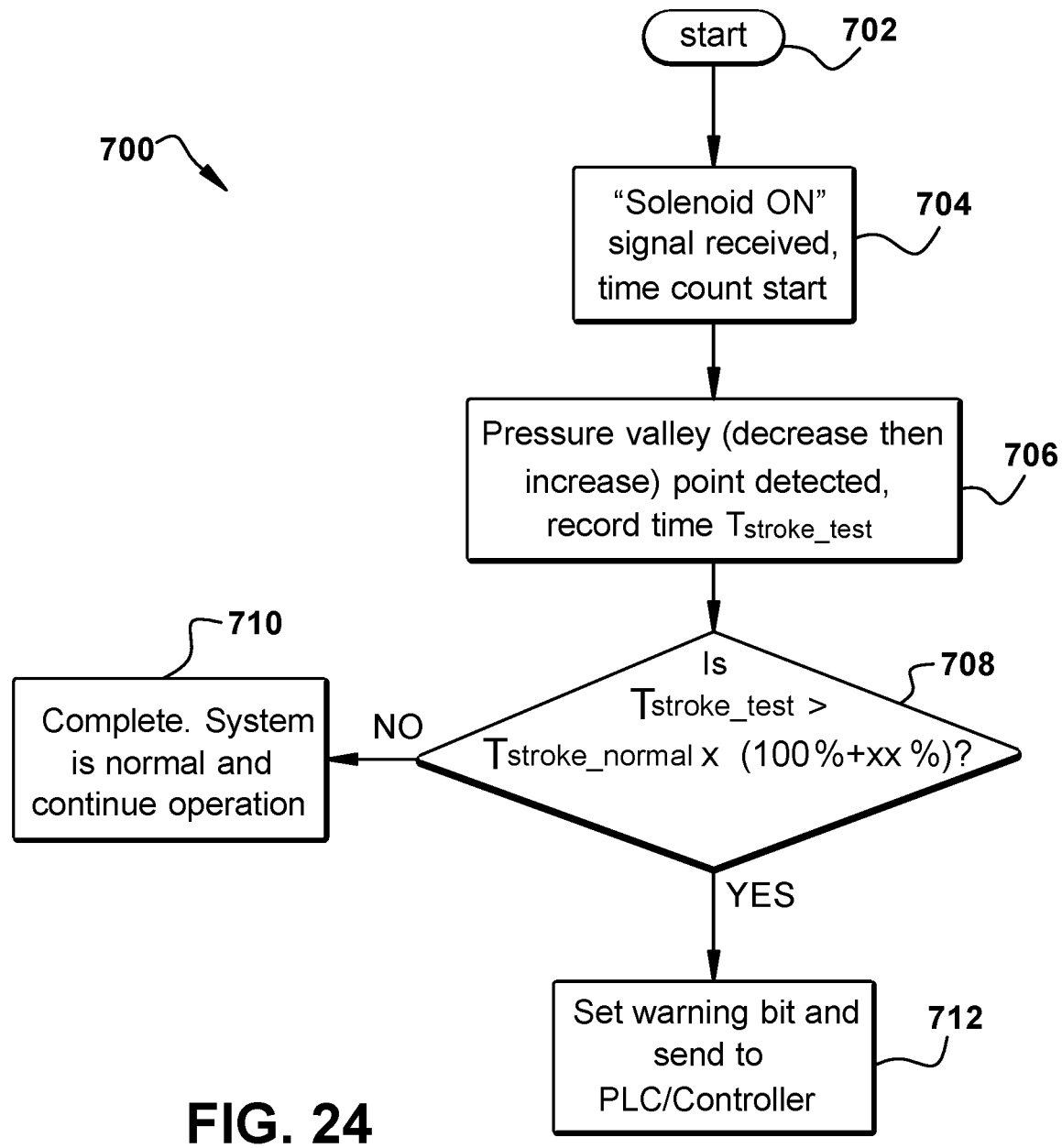
FIG. 24 is a flow diagram illustrating an exemplary control algorithm routine by the onboard controller for stroke time monitoring.
Figure 25:
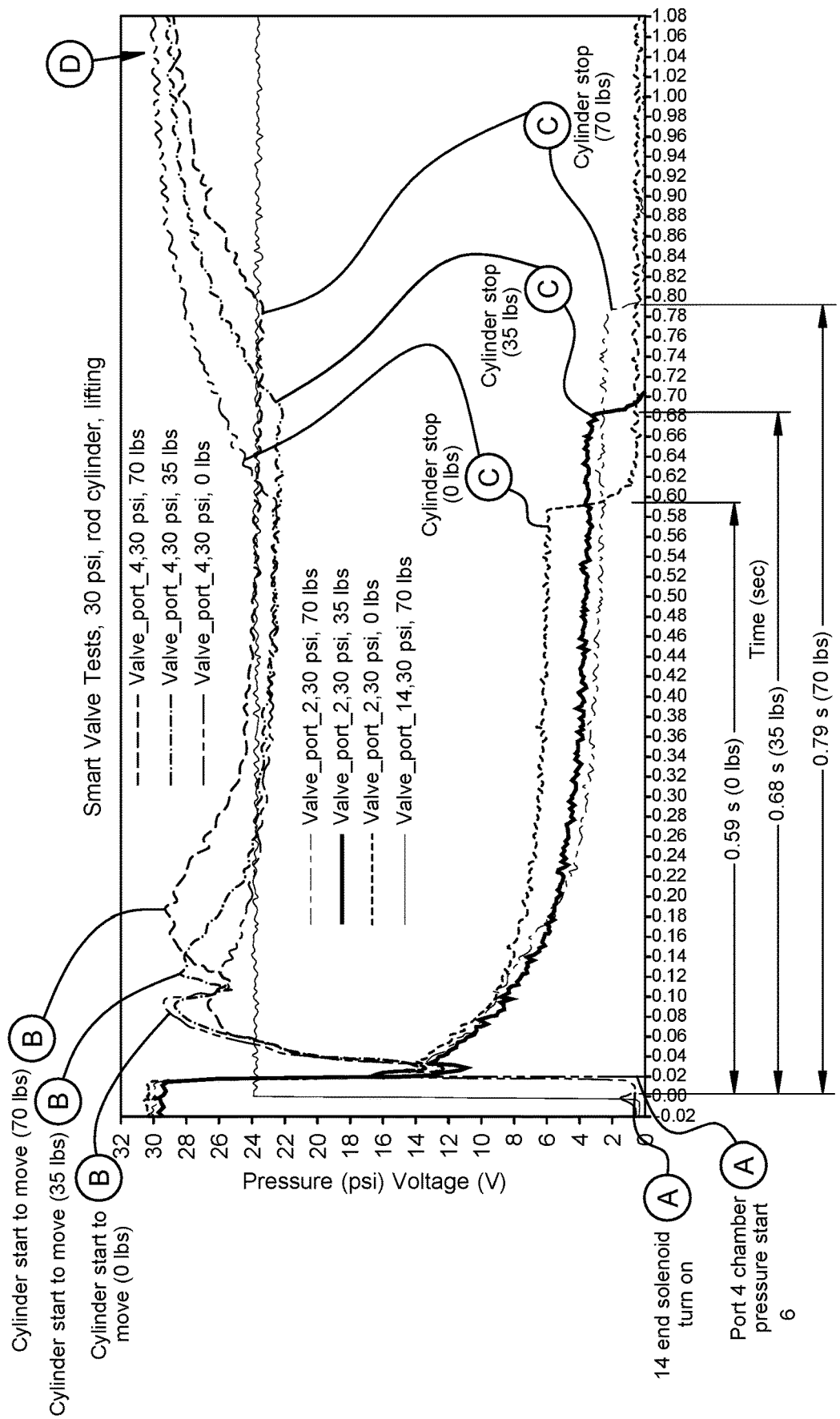
FIG. 25 is an x-y plot diagram illustrating experimental results of pressure versus time during operation of a modular control valve.

Referring to FIG. 24 a flow diagram illustrating an exemplary control algorithm routine 700 for stroke time determination or monitoring is shown. Generally, the exemplary method may be done every time the solenoid is turned on or off. This routine may be available for all valve functions. The stroke time may be defined as the time between control signal and the time cylinder piston stop (see "C" in FIG. 25). Once cylinder response time has been detected, stroke time detection can be started. This may be accomplished by calculating pressure rate of change. For example, a rolling average of 5 past readings (2 ms each) may be compared to prior rolling average. If the pressure change direction (increase or decrease) has been reversed consecutively for 3 rolling average readings, record the time. If the time is greater than stored "normal stroke time" by 50%, set "slow stroke time" bit to 1. If the time is greater than stored "normal stroke time" by 100% set "slow stroke, maintenance required" bit to 1. It is noted that the response time (ON and OFF) may be a function of supply pressure, so a look up table may be required to determine "normal response time" for certain pressure ranges.

More particularly, with exemplary reference to the flow diagram of FIG. 24, the exemplary method 700 may begin prior to step 702, with a set of pre-conditions. Such preconditions may include: (i) Normal condition Tstroke_Normal (Average stroke time) has been stored; (ii) Percentage of deviation from normal condition has been determined (xx %); and (iii) Cylinder response time has been detected. At step 702, the process begins. At step 704, "Solenoid ON" signal received, time count start. At step 706, pressure valley (decrease then increase) point detected, record time Tstroke_test. At step 708, determine if Tstroke_test>Tstroke_normal×(100%+xx %). If no at step 708, at step 710 operation is complete, system is normal and continue operation. If yes at step 708, at step 712 set warning bit and send to PLC controller.

In exemplary embodiments, an exemplary control algorithm routine for short and open circuit detection may be provided (not shown). In exemplary embodiments, the onboard controller 20 may be operable coupled to an electrical driver of the solenoid, for example, and process information from the driver, such as the electrical input and output to the driver. The driver may be an 8-channel low side driver with overcurrent protection and open/shorted load detection. The drive may include built-in diodes to clamp turn off transients generated by inductive loads and can be used to drive the electrical actuator (e.g., stepper motor, DC motor, relay, solenoids, or the like). The onboard controller may detect from the driver when a short circuit has occurred, in which the solenoid resistance is bypassed, current increases, and the onboard controller may send a communication associated with the circuit short to the PLC controller. The onboard controller may detect from the driver when an open circuit has occurred, in which solenoid resistance becomes very high, current is reduced to zero, and the controller may send a communication associated with the open short to the PLC controller. It is understood that for open circuit detection, since there may be an LED or other indicator (visual, audible, etc.) connected in parallel with the solenoid, the driver may not be able to detect the open circuit, and thus may need to measure current (through a resistor-AD conversion to MCU) to detect the open circuit.

In exemplary embodiments, an exemplary control algorithm routine for high or low temperature determination may be provided (not shown). In exemplary embodiments, temperature signals from the temperature sensor(s) (which may be integrated into the pressure sensors XX) may be used to compared against a "normal maximum value" and a "normal minimum value." If the sensed temperature information received by the onboard controller exceeds "normal maximum value," a communication of "high temperature" may be sent to the PLC controller; or may trigger the controller 20 to shutoff the valve. If the sensed temperature information received by the onboard controller falls below "normal minimum value," a communication of "low temperature" may be sent to the PLC controller; or may trigger the controller 20 to shutoff the valve.

Figure 26:
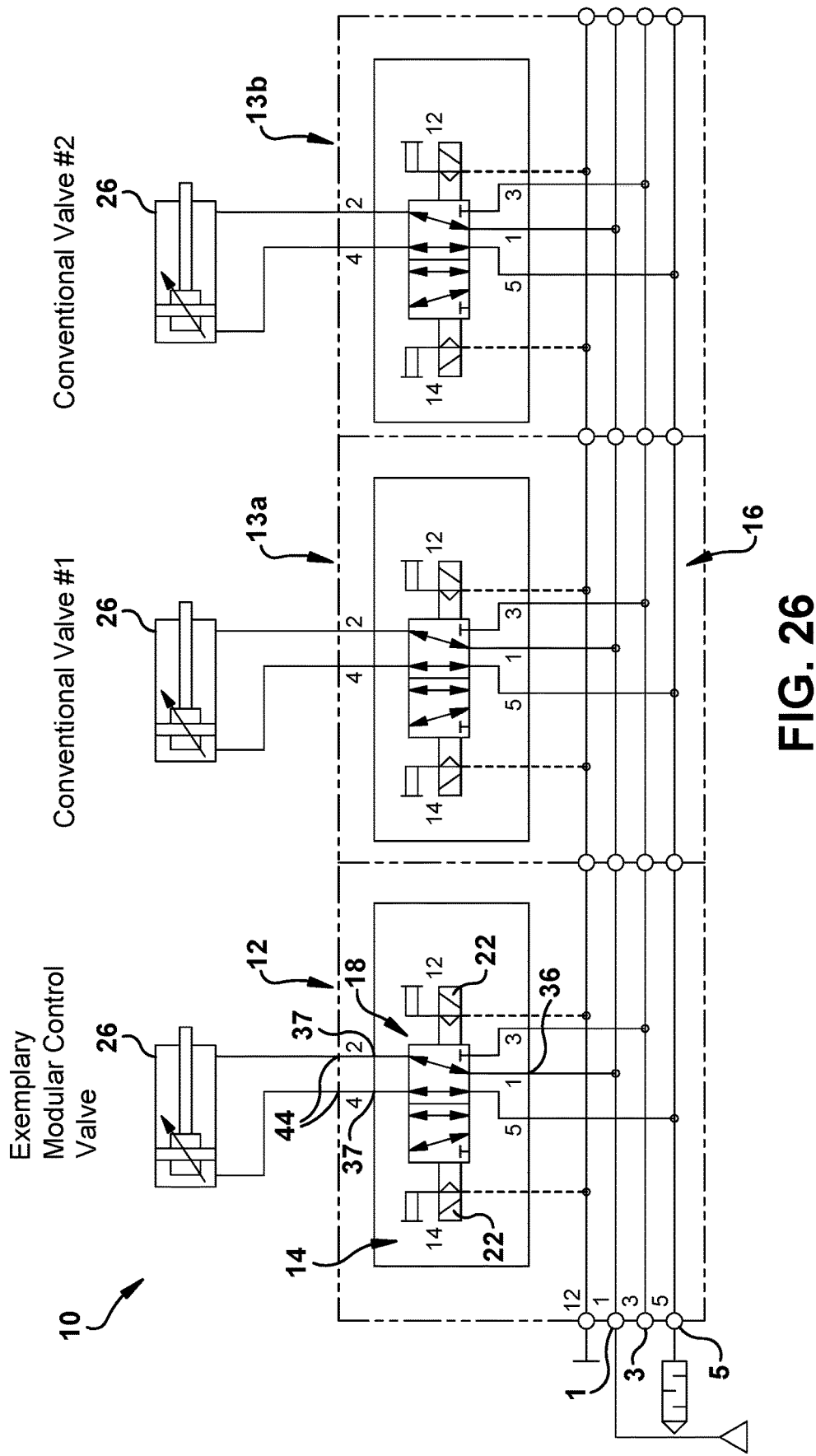
FIG. 26 is a circuit diagram showing another configuration of an exemplary valve bank with the exemplary modular control valve and adjacently connected conventional control valves.

Referring to FIG. 26, an exemplary circuit diagram (e.g., hydraulic or pneumatic) shows another configuration of an exemplary valve bank 10 with the exemplary modular control valve 12 and one or more other adjacently connected conventional control valves (e.g., 13). The same reference numerals utilized in the foregoing embodiments are used to denote structures corresponding to the same or similar structures in the valve bank 10 in FIG. 26. As discussed above, the exemplary modular control valve 12 may be utilized to monitor the condition of adjacent valves, including conventional (non-intelligent) control valves 13. The term "adjacent" as used in this context is mean to include control valves directly adjacent to the modular control valve 12, or indirectly adjacent, provided such valves are included in the valve bank 10. Preferably, the exemplary smart control valve 12 is mounted on the same manifold 16 with other conventional valves 13. Also, preferably, the manifold 16 has shared supply and exhaust air passages. To facilitate monitoring of the adjacent valve(s), at any given time it may be preferable that only one valve is charging or discharging a cylinder.

As shown in the illustrated circuit diagram, the supply port 1 and exhaust ports 3 and 5 are shared with all valves 12, 13a, 13b mounted on the same manifold system 16. If only conventional valve 13b is operating (energize/de-energize solenoid 14 or 12), the exemplary smart valve 12 would be able to detect the pressure changes in port 1 and 3/5. More particularly, the smart valve 12 may be able to calculate the stroke times (extend and retract) of that particular subsystem (valve 13a, 13b+cylinder 26), using similar methods described above. The difference in the present method is that the smart valve 12 may have no knowledge of the solenoid 12, 14 firing. Instead, the smart valve 12 may use the sharp pressure increase (in port 3/5) or decrease (in port 1), resulting from solenoid firing of conventional valve 13b, as the starting time. Since the time from solenoid signal to the sharp pressure increase/decrease typically is less than 50 ms, such condition should be acceptable as the starting time. When conventional valve 13b reaches end of stroke, pressure in port 1 will start to increase and pressure in port 3/5 will start to decrease. This will be the end of stroke time for cylinder 2. Thus, the stroke time of conventional valve 13b can be monitored by the smart valve 12. The same method can apply to conventional valve 13a, or other valves in the valve bank 10. The potential benefit of this feature is that the smart valve 12 can be used to monitor all conventional valves on the same manifold, resulting in a much better value proposition by virtue of the simple plug-and-play nature of the smart valve 12.

Figure 27:
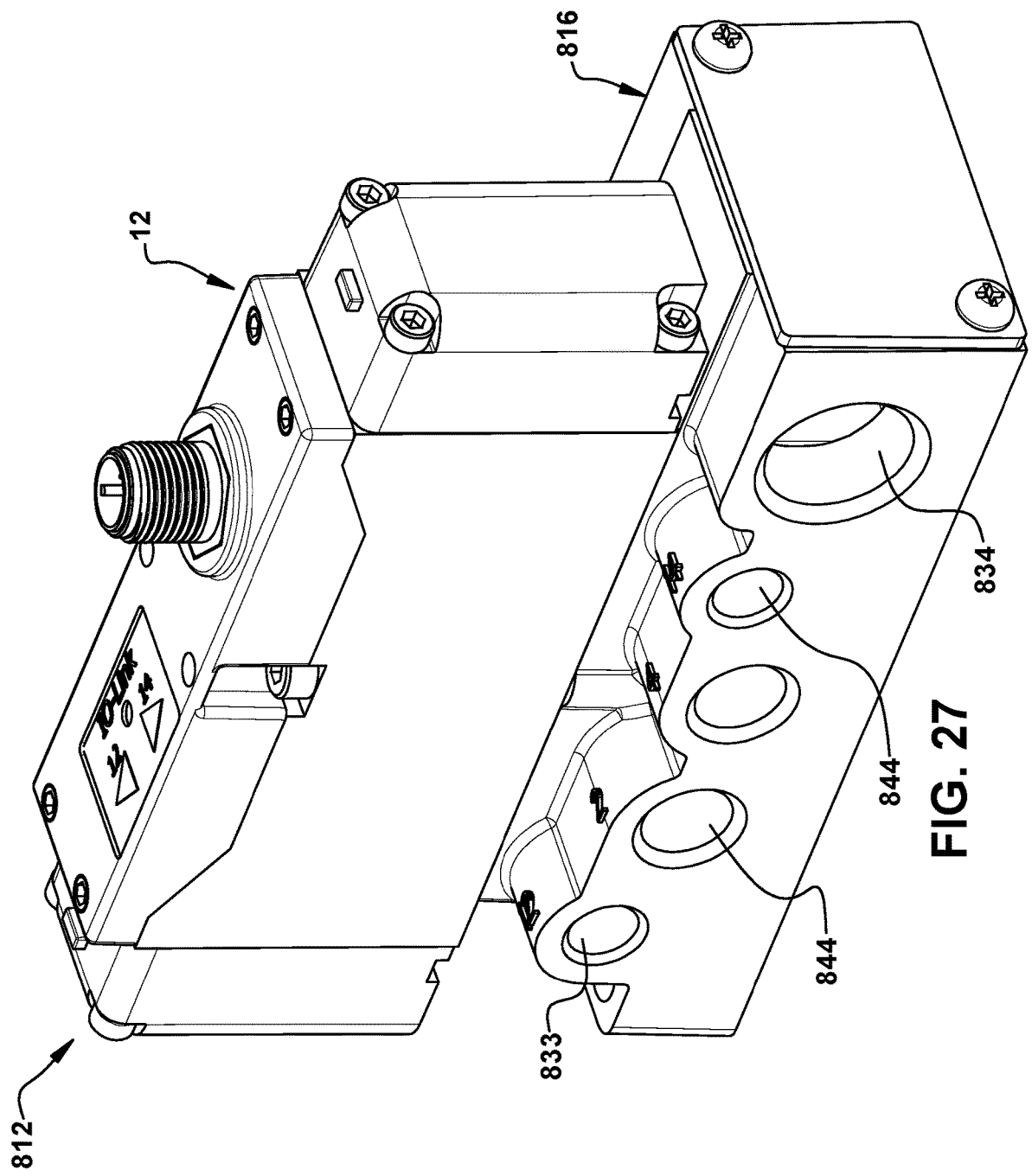
FIG. 27 is a perspective view of an exemplary standalone smart valve including the exemplary valve in FIG. 2.

Referring to FIG. 27, an exemplary smart valve 12 is shown operably coupled to, or unitary with, a single manifold 816 to form a standalone smart valve 812 for operation of a fluid-operated device 26. The configuration and operation of the single smart valve 812 is substantially the same as the above-referenced valve 12, valve bank 10, and manifold 16; consequently, the same reference numerals but indexed by 800 are used to denote structures corresponding to similar structures. In addition, the foregoing description of the valve 12, manifold 16, etc. is equally applicable to the standalone smart valve 812. As shown, the valve 12 is fluidly connected to the manifold 816, which may be a unitary (shared bodies) or coupled connection. The manifold 816 includes a supply port 833 for supplying fluid to the manifold 816, an exhaust port 834 for exhausting fluid (e.g., air) from the manifold 816, and work ports 844 for connecting fluid conduits thereto, thereby enabling fluid connection to the fluid-operated device 26. Such a configuration provides the fluid connections and standalone body for operation of the smart valve 812 without additional valve bank sections.

Figure 28:
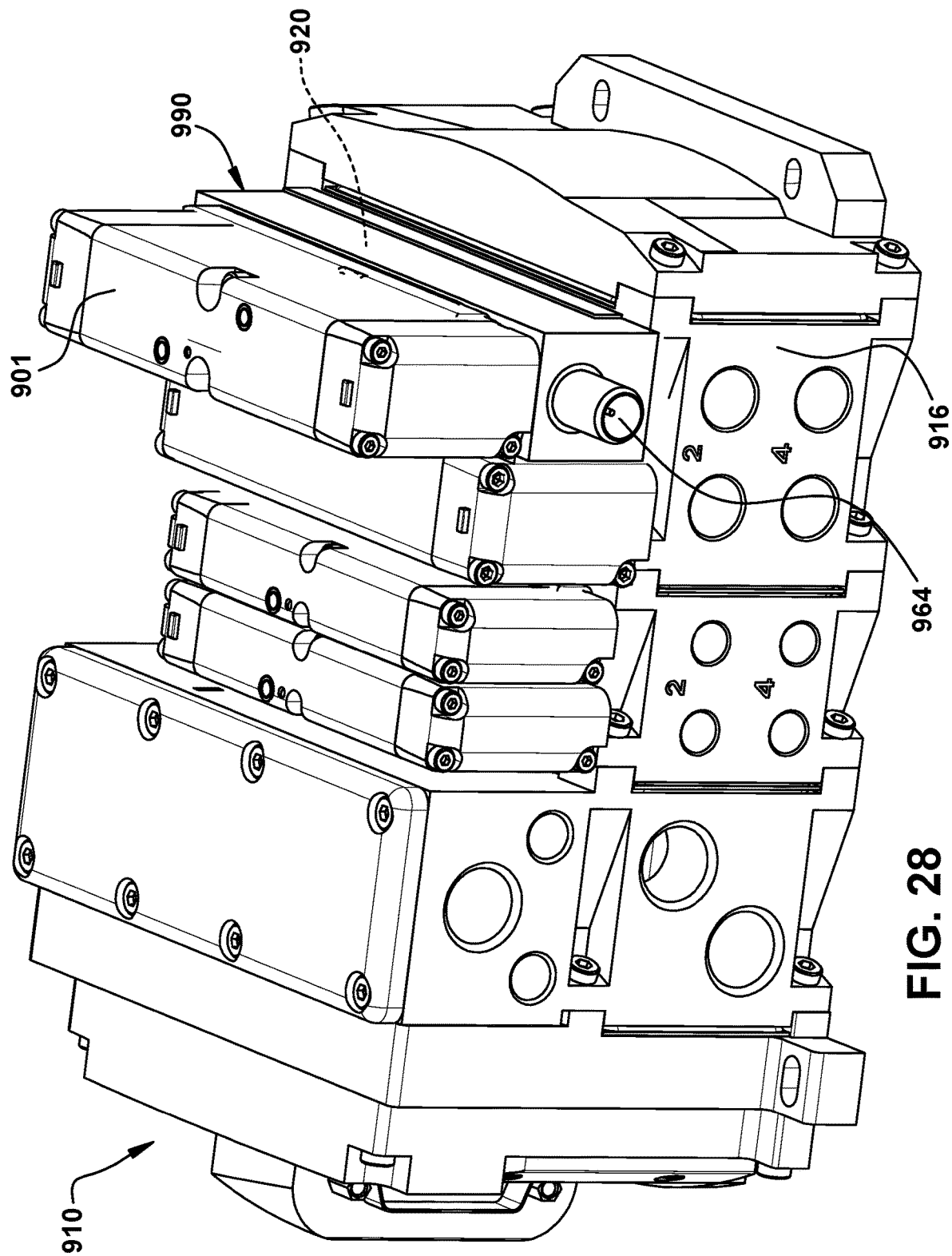
FIG. 28 is another exemplary embodiment of a smart valve according to the present disclosure.

Turning to FIG. 28, another exemplary valve bank 910 having an onboard electronic controller 920 is shown, in which the electronic controller 920 is disposed in a plate 990, block, or other housing that is operably mounted to the valve bank 910. In the illustrated embodiment, the plate 990 having the onboard electronic controller 920 is sandwiched between a conventional valve 901 and manifold 916. This "smart" plate 990 may have an connector 964 (e.g., M12 connector), which can be used to communicate with PLC, similar to the connector 64 described above. The benefit of this approach is that the smart plate 990 can be installed on an existing valve manifold, using existing valves. The smart plate 990 may have the same electronics as in smart valve 12, described above, as well as the same control algorithm and/or same prognostic and diagnostic information.

An exemplary valve bank and/or modular control valve has been described herein. According to an aspect, generally the apparatus includes integrated electronics (sensors, microprocessor etc.) to provide prognostic and/or diagnostic information by monitoring information, such as output ports pressure traces, processing sensor information in microprocessor algorithm, identifying process characteristics and/or applying suitable control logics. In exemplary embodiments, the modular control valve includes a modular valve body having a fluid flow path, a valve member that is movable in the fluid flow path and relative to the valve body to control flow of fluid through the valve body, and an onboard electronic controller that is operably mounted to the valve bank, such as on or in the valve body, or between the valve body and the manifold, or at any other suitable location as may be desired. The onboard electronic controller is operably connected to at least one actuator of the valve, which is configured to control movement of the valve member in response to commands from the onboard electronic controller. The onboard electronic controller provides for diagnostics, feedback and/or control of the control valve, such as via inputs from one or more sensors which may be included in the valve.

Such a configuration of the modular control valve may significantly enhance the tailorability and/or capability of the control valve and/or the valve bank, among the other considerations described above. For example, in many conventional valves or conventional valve bank applications that require pressure feedback, position feedback or other diagnostic feedbacks, one or more sensors such as pressure sensors and position sensors are typically installed external to the valve itself. In such conventional systems, the PLC controller is programmed with the logical operations or software routines are written to perform diagnostic functions. Accordingly, such conventional valves provide no intelligent functions that reside in the modular control valve itself, rather the external sensors just pass along raw data (spool position, pressure) to PLC controller.

The exemplary modular control valve described above addresses the problems of conventional valves by providing an onboard controller that imparts intelligent feedback, diagnostics and/or control to the valve. The modular control valve may be used with conventional valve banks to thereby impart intelligence to the valve bank locally in a plug-and-play manner simply via modular installation of the control valve. Alternatively, or additionally, the modular control valve may enable standalone diagnostics, feedback and/or control of the valve. The valve may have integrated sensors to facilitate such plug-and-play functionality where information is processed locally within the valve. Various functional routines may be stored inside the valve. The control valve may provide a communications interface for sending and receiving information to an upper level controller, such as a PLC, which may command operation of the valve, or the valve may execute functions autonomously, such as when commanded to do so by the PLC.

According to an aspect, a valve bank for controlling flow of a fluid, the valve bank including: a fluid manifold; a plurality of modular control valves fluidly connected to the fluid manifold; and a sensor configured to sense a characteristic associated with a function of the valve bank; wherein: at least one modular control valve of the plurality of modular control valves includes: a valve body adapted for fluid connection to the fluid manifold, the valve body having an inlet passage, an outlet passage, and a fluid flow path extending between the inlet and outlet passages; a valve member movable in the fluid flow path and relative to the valve body to control flow of the fluid through the valve body; an onboard electronic controller operably mounted to the valve body; and at least one actuator operably connected to the onboard electronic controller, the at least one actuator being configured to control movement of the valve member in response to commands from the onboard electronic controller; wherein the onboard electronic controller is operably coupled to the sensor and is configured to receive information from the sensor that corresponds with the characteristic, the onboard electronic controller being configured to control movement of the valve member via the at least one actuator based upon the information received from the sensor.

Embodiments according to the present disclosure may include one or more of the following additional features, separately or in any combination.

In some embodiments, the sensor is operably mounted to the valve body of the at least one modular control valve.

In some embodiments, the sensor is disposed in the fluid flow path of the valve body and is configured to sense a characteristic of the fluid flowing through the fluid flow path.

In some embodiments, the sensor is configured to sense pressure and/or temperature.

In some embodiments, the onboard electronic controller is mounted in a sealed space in a housing portion of the valve body.

In some embodiments, the member is electrically actuated by an electric actuator.

In some embodiments, the electric actuator is a solenoid, a piezoelectric actuator, an electroactive polymer, or the like.

In some embodiments, the modular control valve is a directional control valve, the valve member being a slidable valve spool having a plurality of lands that cooperate with corresponding lands of the valve body to control flow through one or more fluid passages in the valve body.

In some embodiments, the valve body has a mounting face configured to interface with the fluid manifold with a sealing engagement, the mounting face having an inlet port fluidly connected to the inlet passage and an outlet port fluidly connected to the outlet passage for enabling fluid to flow into or out of the valve body from or to the fluid manifold.

In some embodiments, the onboard electronic controller only controls the valve member, or plurality of valve members, that is/are disposed in the valve body on which the onboard electronic controller is mounted.

In some embodiments, the at least one modular control valve further comprises: an electrical transceiver configured to communicate the information from the sensor to an external programmable logic controller (PLC), and configured to receive and transmit commands from the PLC to the onboard electronic controller; wherein the onboard electronic controller is configured to control movement of the valve member via the actuator based upon the commands received from the PLC, which said commands are based upon the information received by the onboard electronic controller from the sensor and communicated to the PLC.

In some embodiments, the electrical transceiver is operably coupled to the PLC with a wired connection or a wireless connection.

In some embodiments, the onboard electronic controller is included in an electrical circuit, the electrical circuit further comprising one or more electrical switches configured to provide manual override to the control of the electronic controller, wherein the one or more electrical switches are operably coupled to respective externally depressible buttons that are adapted for being actuated by a user.

In some embodiments, the onboard electronic controller is configured to perform one or more of the following operations: (i) leakage check function using pressure decay; (ii) actuator response time; (iii) fluid-operated device response time; (iv) load condition sensing; (v) jammed fluid-operated device detection; (vi) dynamic leak check; (vii) cushion check; (viii) load hold monitoring; (ix) short and open circuit detection; (x) high and low temperature detection; (xi) monitoring adjacent control valves; and (xii) monitoring stroke time of valve member and/or fluid operated device.

According to another aspect of the present disclosure, a directional control valve includes: a valve body having a fluid flow path; a directional control valve member movable in the fluid flow path and relative to the valve body to control flow of fluid through the valve body; an onboard electronic controller operably mounted to the valve body; and at least one actuator operably connected to the onboard electronic controller, the at least one actuator being configured to control movement of the valve member in response to commands from the onboard electronic controller.

Embodiments may include one or more of the following additional features, separately or in any combination.

In some embodiments, the directional control valve is a modular directional control valve having a modular valve body, wherein the modular valve body is adapted for mounting to a fluid manifold of a valve bank, in which the modular valve body includes an inlet passage configured to fluidly connect to an outlet passage of the fluid manifold for supplying fluid to the modular control valve.

In some embodiments, the direction control valve further includes a mounting face configured to interface with the fluid manifold, the mounting face having an inlet port fluidly connected to the inlet passage, the inlet port being configured to mate with a corresponding outlet port of the fluid manifold for supplying fluid to the valve body.

In some embodiments, the directional control valve is adapted for mounting on a conventional fluid manifold of a conventional valve bank.

In some embodiments, the control valve further includes a sensor operably mounted to the valve body, the sensor being configured to sense a characteristic associated with a function of at least the modular control valve; wherein the onboard electronic controller is operably coupled to the sensor and is configured to receive information from the sensor that corresponds with the characteristic, the onboard electronic controller being configured to control movement of the valve member via the actuator based upon the information received from the sensor.

In some embodiments, the control valve further includes: an electrical transceiver configured to communicate the information from the sensor to an external programmable logic controller (PLC), and configured to receive and transmit commands from the PLC to the onboard electronic controller; wherein the onboard electronic controller is configured to control movement of the valve member via the actuator based upon the commands received from the PLC, which said commands are based upon the information received by the onboard electronic controller from the sensor and communicated to the PLC.

According to another aspect of the present disclosure, a method of operating a modular control valve, includes mounting the modular control valve to a fluid manifold of a valve bank, wherein the modular control valve includes an onboard electronic controller that is configured to provide diagnostics, feedback and/or control of at least one of the control valve, the valve bank, or an associated device; and performing an operation by using the onboard electronic controller.

In exemplary embodiments, the onboard electronic controller is configured to perform one or more of the following operations: (i) leakage check function using pressure decay; (ii) actuator response time; (iii) fluid-operated device response time; (iv) load condition sensing; (v) jammed fluid-operated device detection; (vi) dynamic leak check; (vii) cushion check; (viii) load hold monitoring; (ix) short and open circuit detection; (x) high and low temperature detection; and (xi) stroke time of fluid operated device and/or valve member.

As used herein, an "operable connection," or a connection by which entities are "operably connected," may be one in which the entities are connected in such a way that the entities may perform as intended. An operable connection may be a direct connection or an indirect connection in which an intermediate entity or entities cooperate or otherwise are part of the connection or are in between the operably connected entities. An operable connection may include the entities being integral and unitary with each other.

Also as used herein, an "operable connection," or a connection by which entities are "operably connected," may be one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

It is understood that embodiments of the subject matter described in this disclosure can be implemented in combination with digital electronic circuitry, controllers, processors, computer software, firmware, and/or hardware. For example, embodiments may be implemented that use one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. F or example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities.

Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them.

The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve bank for controlling flow of a fluid, the valve bank comprising:
   a fluid manifold;
   a plurality of modular control valves fluidly connected to the fluid manifold; and
   a sensor configured to sense a characteristic associated with a function of the valve bank; wherein:
   at least one modular control valve of the plurality of modular control valves includes:
   (i) a valve body adapted for fluid connection to the fluid manifold, the valve body having an inlet passage, an outlet passage, and a fluid flow path extending between the inlet and outlet passages;
   (ii) a valve member movable in the fluid flow path and relative to the valve body to control flow of the fluid through the valve body;
   an onboard electronic controller is operably mounted to the valve bank; and
   at least one actuator is operably connected to the onboard electronic controller; the at least one actuator being configured to control movement of the valve member of the at least one modular control valve in response to commands from the onboard electronic controller;

wherein the onboard electronic controller is operably coupled to the sensor and is configured to receive information from the sensor that corresponds with the characteristic, wherein information received from the sensor comprises pressure traces, wherein the onboard electronic controller is configured to identify at least one event of the at least one modular control valve based on the pressure traces, wherein the onboard electronic controller is further configured to compare a pressure and a time at the at least one identified event to a normal value of pressure and time for the at least one identified event previously stored in the onboard electronic controller, wherein the onboard electronic controller is further configured to transmit results of the comparison to an upper-level programmable control logic controller, and wherein the onboard electronic controller being configured to control movement of the valve member via the at least one actuator based upon the information received from the sensor.

2. The valve bank according to claim 1, wherein the sensor is operably mounted to the valve body of the at least one modular control valve.

3. The valve bank according to claim 1, wherein the sensor is disposed in the fluid flow path of the valve body and is configured to sense a characteristic of the fluid flowing through the fluid flow path.

4. The valve bank according to claim 1, wherein the sensor is configured to sense pressure and/or temperature.

5. The valve bank according to claim 1, wherein the onboard electronic controller is mounted in a sealed space in a housing portion of the valve body.

6. The valve bank according to claim 1, wherein the onboard electronic controller is mounted in a block or plate that is operably mounted in the valve bank.

7. The valve bank according to claim 6, wherein the block or plate having the onboard electronic controller is mounted between the valve body of the at least one modular control valve and at least a portion of the fluid manifold.

8. The valve bank according to claim 1, wherein the valve member is electrically actuated by at least one electric actuator.

9. The valve bank according to claim 1, wherein the at least one electric actuator includes a solenoid, a piezoelectric actuator, or an electroactive polymer.

10. The valve bank according to claim 1, wherein the modular control valve is a directional control valve, the valve member being a slidable valve spool having a plurality of lands that cooperate with corresponding lands of the valve body to control flow through one or more fluid passages in the valve body.

11. The valve bank according to claim 1, wherein the valve body has a mounting face configured to interface with the fluid manifold with a sealing engagement, the mounting face having an inlet port fluidly connected to the inlet passage and an outlet port fluidly connected to the outlet passage for enabling fluid to flow into or out of the valve body from or to the fluid manifold.

12. The valve bank according to claim 1, wherein the onboard electronic controller only controls the valve member, or plurality of valve members, that is/are disposed in the valve body on which the onboard electronic controller is mounted.

13. The valve bank according to claim 1, wherein the at least one modular control valve further comprises:
an electrical transceiver configured to communicate the information from the sensor to an external programmable logic controller (PLC), and configured to receive and transmit commands from the PLC to the onboard electronic controller;
wherein the onboard electronic controller is configured to control movement of the valve member via the at least one actuator based upon the commands received from the PLC, which said commands are based upon the information received by the onboard electronic controller from the sensor and communicated to the PLC.

14. The valve bank according to claim 1, wherein the onboard electronic controller is included in an electrical circuit, the electrical circuit further comprising one or more electrical switches configured to provide manual override to the control of the electronic controller,
wherein the one or more electrical switches are operably coupled to respective externally depressible buttons that are adapted for being actuated by a user.

15. The valve bank according to claim 1, wherein the onboard electronic controller is configured to perform one or more of the following operations:
(i) leakage check function using pressure decay;
(ii) actuator response time;
(ii) fluid-operated device response time;
(iv) load condition sensing;
(v) jammed fluid-operated device detection;
(vi) dynamic leak check;
(vii) cushion check;
(viii) load hold monitoring;
(ix) short and open circuit detection;
(x) high and low temperature detection;
(xi) monitoring adjacent control valves; and
(xii) monitoring stroke time of valve member and/or fluid operated device.

16. The valve bank according to claim 1, wherein the at least one modular control valve of the plurality of modular control valves further includes a mounting face with at least one work port for supplying or receiving fluid flow from a fluid operate device,
wherein the onboard electronic controller is further configured to compare a detected pressure differential for the at least one identified event to a normal value of a pressure differential for the at least one identified event previously stored in the onboard electronic controller,
wherein the detected pressure differential comprises a pressure differential between at least one of:
a pressure sensor reading from a pressure sensor in the at least one modular control valve and a pressure sensor reading from a pressure sensor in another modular control valve of the plurality of modular control valves at the least one identified event, or
a pressure sensor reading from a pressure sensor in the at least one modular control valve and a pressure sensor reading from a pressure sensor in a chamber of the fluid operating device.

* * * * *